(12) United States Patent
Sato et al.

(10) Patent No.: US 6,370,533 B1
(45) Date of Patent: Apr. 9, 2002

(54) ELECTRONIC MEETING SYSTEM, INFORMATION PROCESSOR, AND RECORDING MEDIUM

(75) Inventors: Chihiro Sato; Hiroshi Katsurabayashi; Shinji Kita; Toru Tanaka, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/386,381

(22) Filed: Aug. 31, 1999

(30) Foreign Application Priority Data

Oct. 12, 1998 (JP) .......................................... 10-289447

(51) Int. Cl.⁷ .............................................. G06F 17/30
(52) U.S. Cl. ......................................... 707/10; 345/751
(58) Field of Search .............................. 707/10, 104, 9; 709/204, 205, 206, 321, 228, 217, 247, 231, 250; 345/751–753, 501, 850, 741, 760, 742, 755, 759, 733; 705/57, 1, 80, 54, 52

(56) References Cited

U.S. PATENT DOCUMENTS

| | | | |
|---|---|---|---|
| 5,664,126 A | * | 9/1997 | Hirakawa et al. ........... 345/751 |
| 5,864,848 A | * | 1/1999 | Horvitz et al. .................. 707/6 |
| 6,119,147 A | * | 9/2000 | Toomey et al. ............. 709/204 |
| 6,279,000 B1 | * | 8/2001 | Suda et al. .................... 707/10 |

FOREIGN PATENT DOCUMENTS

| | | |
|---|---|---|
| JP | 5-2540 | 1/1993 |
| JP | 5-35411 | 2/1993 |
| JP | 5-236131 | 9/1993 |
| JP | 6-178296 | 6/1994 |
| JP | 6-266632 | 9/1994 |
| JP | 9-106331 | 4/1997 |
| JP | 10-40058 | 2/1998 |
| JP | 10-40068 | 2/1998 |

* cited by examiner

*Primary Examiner*—John Breene
*Assistant Examiner*—Mohammad Ali
(74) *Attorney, Agent, or Firm*—Oliff & Berrdidge, PLC

(57) ABSTRACT

The present invention provides an electronic meeting system which enables a user to refer to the progress of a meeting from the user's unique view point. A first communication unit communicates information with a client. A first analysis unit analyzes the information transmitted. A first attribute extraction unit extracts the attribute included in the information. A first memory unit stores the attribute and the information in correlated relation. An information management unit manages information and extracts required information to return it to the client. A second communication unit communicates information with the sever. An input unit receives information input from a mouse. A second analysis unit analyzes input information. A second attribute extraction unit extracts the attribute included in the information. A second memory unit stores the extracted attribute. A selection unit selects a desired attribute from among attributes stored. A display unit displays the information written in the virtual space on a display unit in the form of display type corresponding to the selected attribute.

17 Claims, 29 Drawing Sheets

FIG. 6

| MEETING INFORMATION ID | COMMON SCREEN INFORMATION LIST | | | INDIVIDUAL SCREEN INFORMATION LIST | | | | |
| --- | --- | --- | --- | --- | --- | --- | --- | --- |
| | TITLE | RECEPTION TIME | COORDINATE | MEETING INFORMATION ID | SPEAKER | RECEPTION TIME | SPEECH CONTENT | COORDINATE |
| ID 1 | APPLICATION REQUEST | 1998/6/5 17:00 | (x0, y0, x1, y1) | ID 1 | AAA | 1998/6/5 17:00 | PATENT, CLAIM, EXAMPLE, ... | (x0, y0, z0, x1, y1, z1, x2, y2, z2, x3, y3, z3), (...) |
| ...... | | | | ...... | | | | |

FIG. 7

| MEETING INFORMATION ID | SPEAKER | RECEPTION TIME | TITLE | SPEECH CONTENT | SPEECH INFORMATION |
|---|---|---|---|---|---|
| ID 0 | AAA | 1998/6/5 17:00 | APPLICATION REQUEST | PATENT, CLAIM, EXAMPLE, ... | SPEECH INFORMATION 1 |
| ⋮ | ⋮ | ⋮ | ⋮ | ⋮ | ⋮ |

FIG. 8

| MEETING INFORMATION ID | ATTRIBUTE 1 | ATTRIBUTE 2 | ... | ATTRIBUTE n | SPEECH INFORMATION |
|---|---|---|---|---|---|
| ID 0 | Ai @ccc.co.jp | 1998/6/5 | ... | ON THIS SUBJECT ... | |
| ... | ... | ... | ... | ... | ... |

FIG. 13

| SPEAKER |
| --- |
| RECEPTION TIME |
| TITLE |
| SPEECH CONTENT |

FIG. 14

● ABSOLUTE TIME AXIS
○ TOTAL WORKING TIME AXIS
○ TOTAL SPEECH TIME AXIS
○ TOTAL PARTICIPATION TIME AXIS

FIG. 15

○ DISPLAY ALL
● HIGH APPEARANCE FREQUENCY
○ AVERAGE APPEARANCE FREQUENCY
○ LOW APPEARANCE FREQUENCY
○ NEWEST SPEECH
○ PAST SPEECH
○ KEY WORK SPECIFICATION
○ INFORMATION INPUT
○ INFORMATION SPECIFICATION

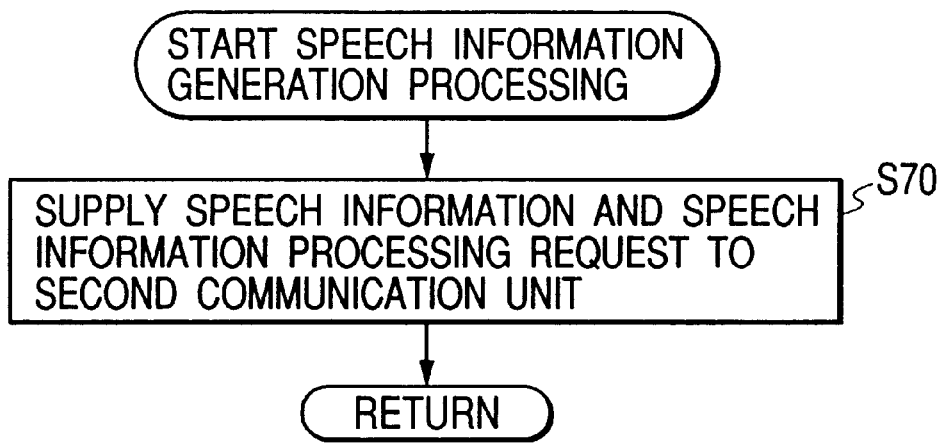
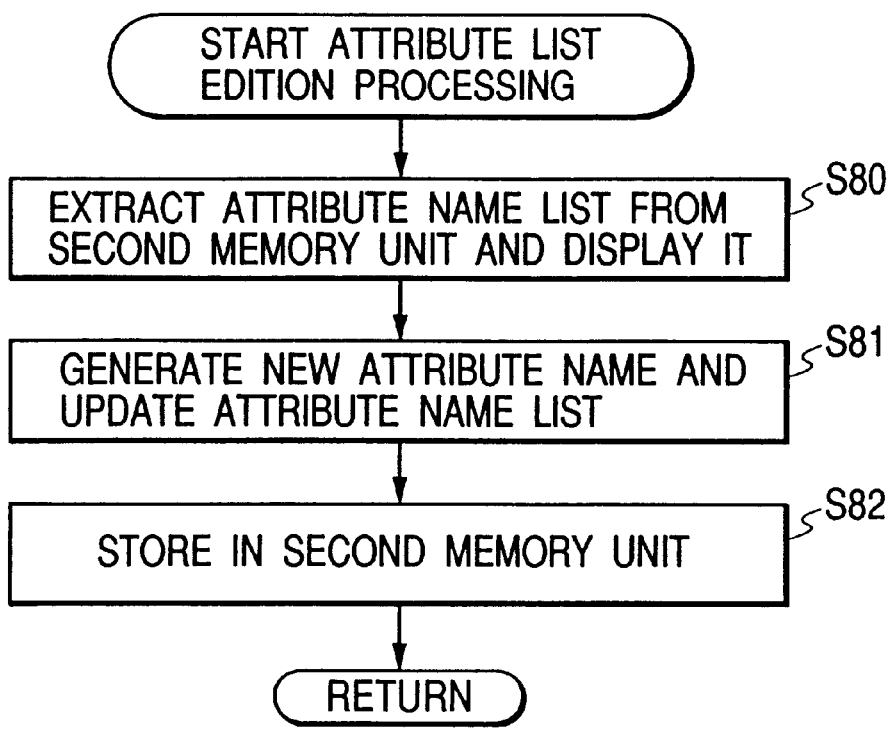

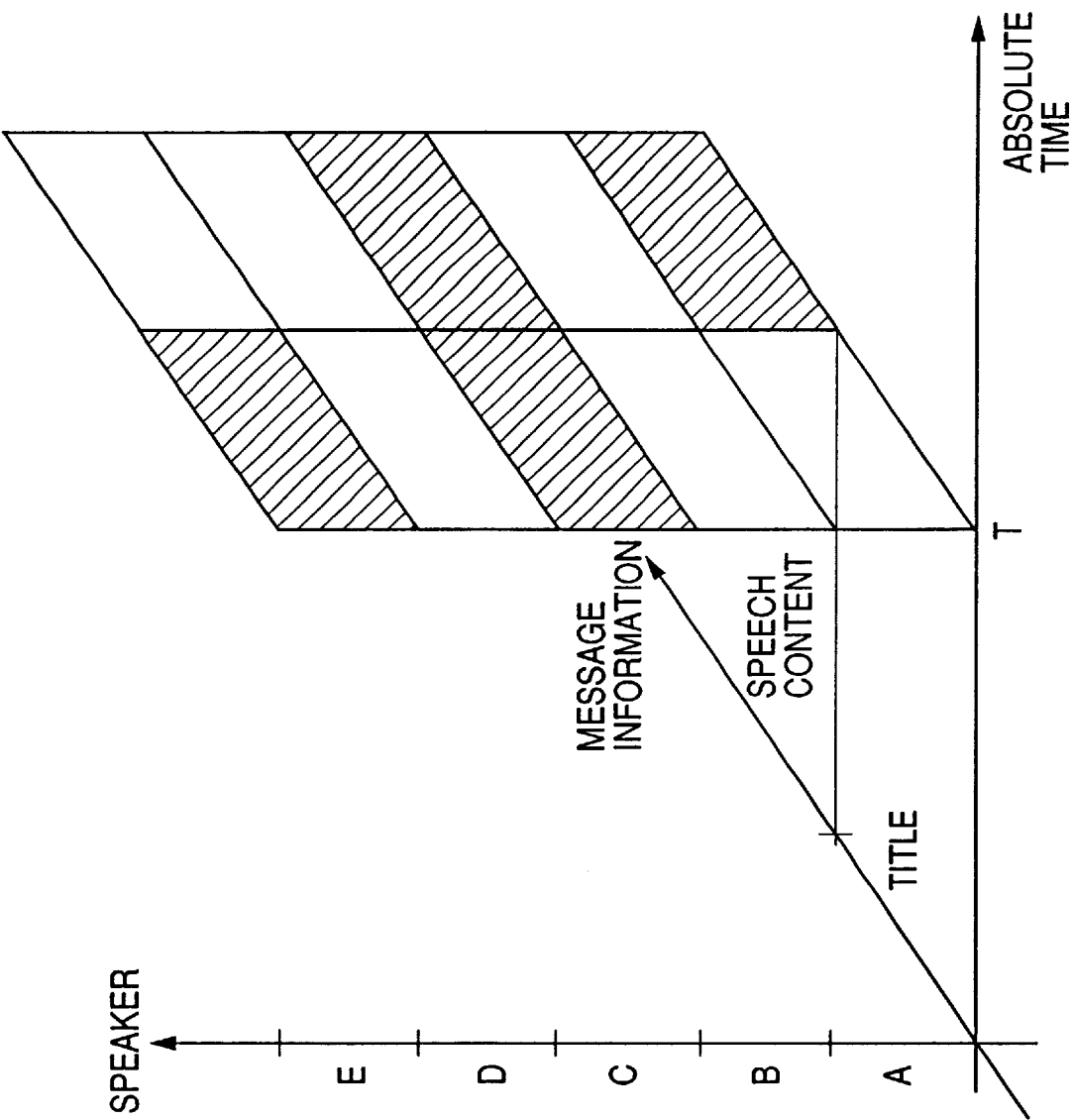

ELECTRONIC MEETING SYSTEM, INFORMATION PROCESSOR, AND RECORDING MEDIUM

BACKGROUND OF THE INVENTION

1. Field of the Invention

The present invention relates to an electronic meeting system, an information processor, and a recording medium, and more particularly relates to an electronic meeting system in which a plurality of clients access virtual space provided by a server to exchange information mutually, an information processor for clients, and a computer-readable recording medium having a recorded program for the computer to function as a client.

2. Description of Related Art

Heretofore, the conventional electronic meeting system in which a plurality of clients access virtual space provided by a server and exchange information each other has been known.

In such a system, when a meeting is held between users located far apart each other, first a meeting group is formed by specifying addresses of clients, namely personal computers or the like, which meeting participants use. Next, each user starts up an application program used by the meeting group, thus it is possible to exchange messages, and the meeting is ready for discussion.

At that time, meeting information for displaying meeting situation is displayed on a common screen (screen commonly viewed by all participants) of a display apparatus of each personal computer of participants, and the display content is changed correspondingly to operation performed by each participant on the common screen. As described hereinabove, each participant can overlook the meeting situation on the personal computer of the participant itself, and participates in the meeting by writing opinions of the participant itself.

It is important for a user to easily understand the development of the meeting because a user is not always attending the meeting.

Heretofore, a method in which the flow of meeting is expressed with temporal history has been known as a method for understanding the development of a meeting. Roughly classified, two types of methods used for a such purpose have been known.

(1) The method for showing temporal history of a meeting in the form of diagram

The most generally used method is a method in which speeches and opinions in a meeting are displayed on a common screen and speeches and opinions given to the precedent speeches and opinions are displayed successively under hierarchically, as it is seen in a news group or electronic bulletin board. A user can know the temporal history of speeches and opinions from the display.

Some derivations of this method have been proposed. For example, in "Electronic meeting supporting system" disclosed in Japanese Published Unexamined Patent Application No. Hei 5-236131, a method is proposed in which an attribute value for representing the phase of a meeting is added to a speech for clear understanding of temporal history of the discussion in each phase of the meeting. Further in "Electronic meeting system having proceeding preparation function" disclosed in Japanese Published Unexamined Patent Application No. Hei 5-2540, a method is proposed in which a chairman or manager who holds a meeting marks important information among various information spoken during the meeting to provide meeting information in which only important speeches are shown. Yet further, in "Electronic bulletin board browser" disclosed in Japanese Published Unexamined Patent Application No. Hei 9-106331, a method is proposed in which articles are grouped by means of referential relation among articles and the grouped articles are displayed.

On the other hand, in "Method and apparatus for processing information of electronic meeting system" disclosed in Japanese Published Unexamined Patent Application No. Hei 6-266632, a method in which "speech chart" is used is proposed. In this method, speech time period of each participant is expressed in the form of chart by means of a mechanism for displaying speech time zone and the speech content of each meeting participant.

(2) The method for expressing the temporal history of a meeting

The most basic method is a method in which a meeting is recorded by use of a tape recorder or video recorder and then the recorded information is reproduced as required. As the recording method used in this case, in "Electronic meeting system" disclosed in Japanese Published Unexamined Patent Application No. Hei 6-178296, a method in which audio or video switching time and finish time are added to and recorded in speech information is proposed, and further in "Apparatus for automatic preparation of document" disclosed in Japanese Published Unexamined Patent Application No. Hei 5-35441, a method in which only the information corresponding to recording permission phrases set previously is recorded is proposed.

On the other hand, as the reproducing method used in this case, for example, in "Method for managing cooperative work information and system for supporting cooperative work" disclosed in Japanese Published Unexamined Patent Application No. Hei 10-40058, a method for reproduction of discussion history is proposed in which common information generated in a cooperative work is layered in information unit for managing and layers are overlapped along the time series correspondingly to the request of a user. Further in "Meeting information recording method, meeting information recording apparatus, and meeting information reproducing apparatus" disclosed in Japanese Published Unexamined Patent Application No. Hei 10-40068, a method is proposed in which operation and information on a common screen are extracted simultaneously with audio information to reproduce the discussion history by use of both audio and video media.

However, the above-mentioned conventional arts are disadvantageous in various points described hereunder.

In detail, in the former method for expressing the temporal history, temporal progress and change of various information are expressed on a two-dimensional plane, therefore when certain information is compared with other information (for example, the temporal progress of meeting and speech chart of a speaker are compared simultaneously), the respective information is displayed on separate windows for comparison. However, it is required to open two windows simultaneously, therefore this method is disadvantageous in that the operation is complicated. Further it is required for a user to correlate separate information in his head, therefore this method is disadvantageous in that it is difficult to understand intuitively the display content.

On the other hand, in the latter method for expressing the temporal history, the information to be reproduced is retrieved and the retrieved information is reproduced, the reproduction requires some amount of time, therefore this method is disadvantageous in that some amount of time is required to understand the temporal history of the meeting.

Further, both methods are disadvantageous commonly in that the referable meeting information and the method used for reference are limited previously by the system, therefore it is difficult to understand and analyze the meeting from various view points of respective participants depending on the meeting situation.

The present invention is accomplished to solve the problems described hereinabove, it is an object of the present invention to provide an electronic meeting system for supporting participants so that respective participants can overlook the meeting information from various standpoints correspondingly to the meeting situation and understand the temporal progress of the meeting intuitively.

It is another object of the present invention to provide an information processor for reproducing only the required part of the displayed meeting information easily.

SUMMARY OF THE INVENTION

To solve the above-mentioned problem, the present invention provides an electronic meeting system where a plurality of clients access virtual space provided by a server for exchanging information, wherein the above-mentioned sever is provided with a first communication unit for communicating information between the clients, a first analysis unit for analyzing the information when the first communication unit receives the information transmitted from the client, a first attribute extraction unit for extracting the attribute included in the information if the information is judged to be new information to be written in the virtual space as the result of analysis performed by the first analysis unit, a first memory unit for storing the attribute extracted by the first attribute extraction unit and the information which are correlated, and an information management unit which manages information stored in the first memory unit, and if the information is judged to be information that requires to be referred to the information stored in the first memory unit as the result of analysis performed by the first analysis unit, then extracts the corresponding information and supplies it to the first communication unit to return it to the client, and the above-mentioned client is provided with a second communication unit for communicating information with the server, an input unit for receiving desired information input, a second analysis unit for analyzing the information transmitted from the server and received from the second communication unit or the information entered by the input unit, a second attribute extraction unit for extracting the attribute included in the information if the information is judged to be information to be displayed as an output as the result of analysis performed by the second analysis unit, a second memory unit for storing the attribute extracted by the second attribute extraction unit, a selection unit for selecting a desired attribute from among attributes stored in the second memory unit, and a display unit for displaying an element in accordance with the information written in the virtual space in the form of display type corresponding to the attribute selected by the selection unit.

In the server, the first communication unit communicates information with the client. The first analysis unit analyzes the information when the first communication unit receives information transmitted from the client. The first attribute extraction unit extracts the attribute included in the information if the information is new information to be written in the virtual space as the result of analysis performed by the first analysis unit. The first memory unit stores the attribute extracted by the first attribute extraction unit and the information in the correlated relation. The information management unit manages the information stored in the first memory unit, and if the information is judged to be referred to the information stored in the first memory unit as the result of analysis performed by the first analysis unit, then extracts the corresponding information, supplies the extracted information to the first communication unit to return it to the client. In the client, the second communication unit communicates information with the server. The input unit receives desired information input. The second analysis unit analyzes the information transmitted from the server which is received by the second communication unit, or the information supplied from the input unit. The second attribute extraction unit extracts the attribute included in the information if the information is judged to be displayed as output as the result of analysis performed by the second analysis unit. The second memory unit stores the attribute extracted by the second attribute extraction unit. The selection unit selects the desired attribute from among attributes stored in the second memory unit. The display unit displays the element in accordance with the information written in the virtual space in the form of display type corresponding to the attribute selected by the selection unit.

The present invention provides an information processor served as a client for taking access to virtual space provided by a server to exchange information, which information processor is provided with a communication unit for communicating information with the server, an input unit for receiving a desired information input, an analysis unit for analyzing the information transmitted from the server which is received by the communication unit or the information supplied from the input unit, an attribute extraction unit for extracting the attribute included in the information if the information is judged to be displayed as output as the result of analysis performed by the analysis unit, a memory unit for storing the attribute extracted by the attribute extracting unit, a selection unit for selecting a desired attribute from among attributes stored in the memory unit, and a display unit for displaying an element in accordance with the information written in the virtual space in the form of display type which is selected by the selection unit.

In the above-mentioned information processor, the communication unit communicates information with the server. The input unit receives desired information input. The analysis unit analyzes the information transmitted from the server which is received by the communication unit or the information supplied from the input unit. The attribute extraction unit extracts the attribute included in the information if the information is judged to be displayed as output as the result of analysis performed by the analysis unit. The memory unit stores the attribute extracted by the attribute extraction unit. The selection unit selects a desired attribute from among attributes stored in the memory unit. The display unit displays the element in accordance with the information written in the virtual space in the form of display type corresponding to the attribute selected by the selection unit.

BRIEF DESCRIPTION OF THE DRAWINGS

FIG. 6 is a diagram for showing an example of a display information table.

FIG. 7 is a diagram for showing an example of a meeting information table.

FIG. 8 is a diagram for showing an example of a meeting information table.

FIG. 13 is an exemplary display of an attribute name list.

FIG. 14 is an exemplary dialogue box displayed for setting the time axis.

FIG. 15 is an exemplary dialogue box displayed for setting the speech content axis.

FIG. 34 is a flowchart for describing the details of "speech information generation processing" shown in FIG. 30.

FIG. 35 is a flowchart for describing the details of "attribute list edition processing" shown in FIG. 30.

FIG. 42 is a diagram for showing further another example of image information displayed in the individual information display area.

DETAILED DESCRIPTION OF THE PREFERRED EMBODIMENTS

Embodiments of the present invention will be described in detail hereinafter with reference to the drawings.

Figure 1:
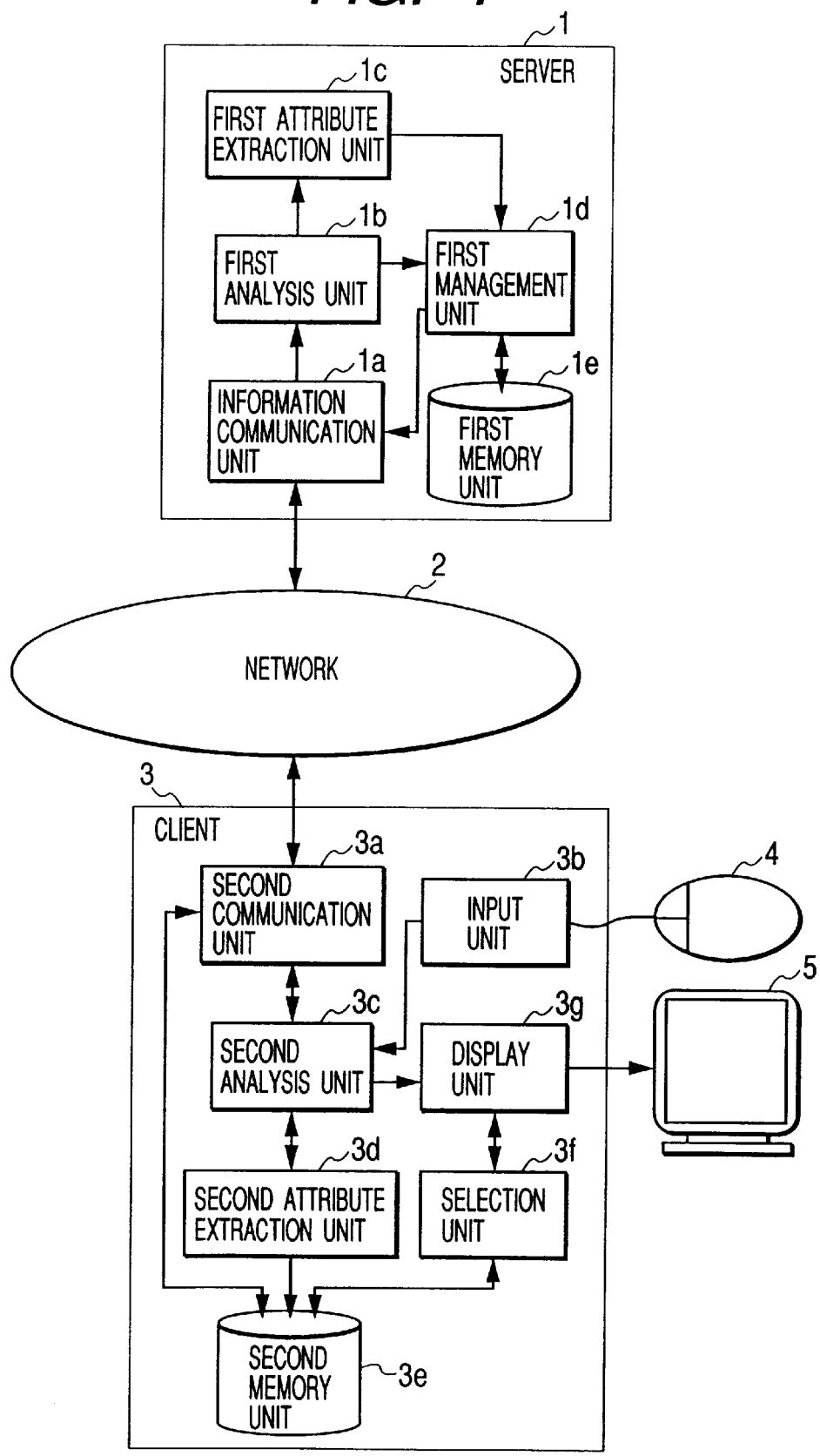
FIG. 1 is a block diagram for illustrating an exemplary structure of an embodiment of the present invention.

FIG. 1 is a block diagram for illustrating an exemplary structure of an embodiment of an electronic meeting system in accordance with the present invention. As shown in this drawing, the electronic meeting system mainly comprises a server 1, a network 2, and a client 3.

The server 1 comprises a first communication unit 1a, a first analysis unit 1b, a first attribute extraction unit 1c, an information management unit 1d, and a first memory unit 1e.

Herein, the first communication unit 1a is connected electrically to the network 2 and communicates information with the client 3, and generates a request (request to the client 3) as required and transmits it to the client 3.

The first analysis unit 1b analyzes a request when the communication unit 1a receives the information transmitted from the client 3, and performs corresponding processing.

The first attribute extraction unit 1c extracts the attribute included in the information when it is found that the information is new information to be written on virtual space as the result of analysis performed by the first analysis unit 1b.

The first memory unit 1e correlates the attribute extracted by the first attribute extraction unit 1c with the information and stores them.

The information management unit 1d manages the information stored in the first memory unit 1e, and when it is found that the target information is indicated to be referred to the information stored in the first memory unit 1e, then extracts the corresponding information and supplies it to the first communication unit 1a so that the first communication unit 1a returns it to the client 3.

Next, the network 2 comprises, for example, the internet or LAN (Local Area Network), and transmits the information with the server 1 and the client 3.

The client 3 comprises a second communication unit 3a, an input unit 3b, a second analysis unit 3c, a second attribute extraction unit 3d, a second memory unit 3e, a selection unit 3f, and a display unit 3g.

The second communication unit 3a is connected electrically to the network 2 so as to communicate the information with the server 1, and generates a request (request to the server 1) as required and transmits the request to the server 1.

The input unit 3b is connected to an input device such as a mouse 4 or a key board not shown in the drawing, and receives the information from these devices.

The second analysis unit 3c analyzes the information which has been transmitted from the server 1 and received by the second communication unit 3a or the information supplied from an input device such as the mouse 4 by way of the input unit 3b, and performs corresponding processing.

The second attribute extraction unit 3d, when it is found that the information is the information to be supplied to the display device 5 as the result of analysis performed by the second analysis unit 3c, extracts the attribute included in the information.

The second memory unit 3e stores the attribute and other information extracted by the second attribute extraction unit 3d.

The selection unit 3f selects a desired attribute from among attributes stored in the second memory unit 3e correspondingly to the setting.

The display unit 3g displays the information written in the virtual space in the form of display type corresponding to the attribute selected by the selection unit 3f on the display device 5.

The display device 5 comprises, for example, a CRT (Cathode Ray Tube), and displays the video signal supplied from the display unit 3g.

In the electronic meeting system described hereinabove, one server 1 and one client 3 are shown in the drawing to simplify the drawings, however a plurality of servers and clients are actually connected.

Next, the outline of the operation of the embodiment described hereinabove is described.

Figure 2:
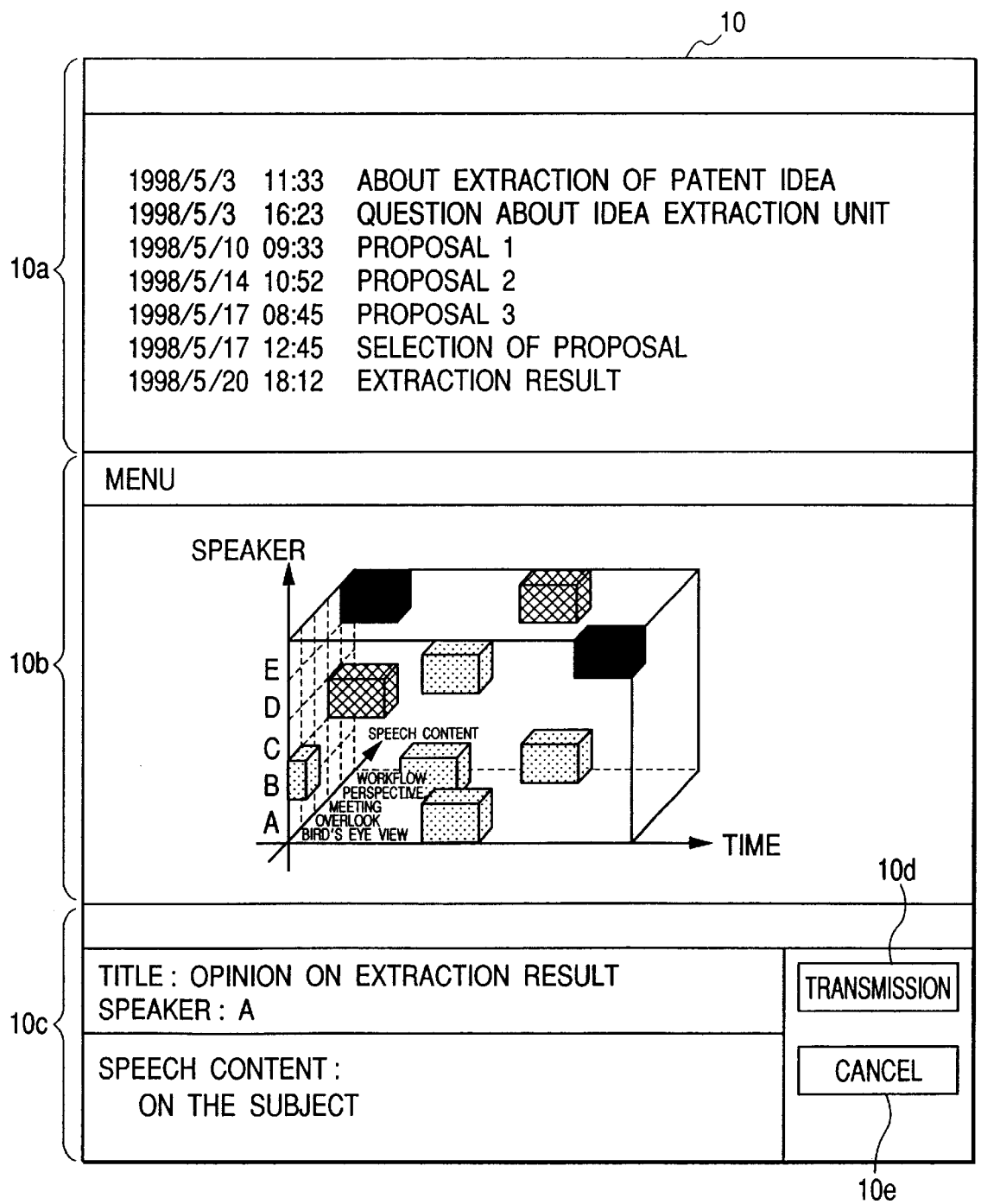
FIG. 2 is a diagram for describing the outline of operation of the embodiment shown in FIG. 1.

FIG. 2 shows an exemplary display screen displayed on the display device 5 of the present embodiment shown in FIG. 1. In this display example, a common information display area 10a for displaying the same information (meeting information) to all the meeting participants is displayed on the uppermost portion of a window 10. Under the common information display area 10a, an individual information display area 10b is displayed where the information serves individually to respective users to overlook the meeting information from the unique view point of each user. Furthermore, an speech input area 10c where each user gives a speech to the meeting is displayed under the individual information display area 10b.

A transmission button 10d displayed on the right end of a speech input area 10c is operated when an input speech information is transmitted to the server 1. A cancel button 10e displayed under the transmission button 10d is operated when input speech information is canceled.

When the transmission button 10d is operated after desired speech information is entered in the speech input area 10c, the second analysis unit 3c detects it, the second communication unit 3a adds address information and transmission time information to the input speech information and then transmits it to the server 1 by way of the network 2.

In the server 1, the first analysis unit 1b analyzes the received information to detect that this information is a speech to the meeting, and the information is stored in the area of the first memory unit 1e where the meeting information is to be stored.

The new speech information stored in the first memory unit 1e as described hereinabove is transmitted to the client 3 and other clients (not shown in the drawing).

In a client, the second communication unit 3a receives it, and detects that this information is a new speech information input based on the analysis result obtained by the second analysis unit 3c, and the received information is displayed on the common information display area 10a of the display device 5 by the display unit 3g. When a plural pieces of speech information are entered, these information pieces are displayed in the order of time series.

The above-mentioned operation is repeated, and when meeting participants propose a plural pieces of speech information, a user can overlook the past progress of the meeting by use of the individual information display area 10b. The processing for overlooking the past progress is described hereunder.

First, a user determines a coordinate for overlooking the past progress of the meeting. For example, the user selects "time", "speaker", and "key word" which are the attribute of the speech information as the coordinate, and if the user enters the time "August to September, 1998", speakers "A, B, C, D, and E", and keyword "bird's eye view, overlook, meeting, perspective, workflow" as the attribute, then these pieces of information are transmitted to the server 1 by the second communication unit 3a by way of the network 2.

The server 1 retrieves the speech information having the attribute from the first memory unit 1e, and returns it to the client (for example, client 3) who requested for this information.

In the client 3, first a coordinate axis of a three-dimensional space (display target space) having X, Y, and Z axis corresponding respectively to "time", "key word", and "speaker" is displayed on the individual information display area 10b. The speech information transmitted from the server 1 is mapped in the three-dimensional space to display a rectangular parallelepiped (element associated with the information) at the corresponding position. The display color is suitably changed depending on the number of key words included in the speech information. For example, the display color is changed in the order of the number of key words from the largest from red, orange, yellow, green, etc.

As the result of processing described hereinabove, a screen as described in FIG. 2 is displayed on the individual information displaying are 10b, a user can overlook the progress of the meeting with reference to this screen. It is possible to set the attribute of the coordinate axis arbitrarily, a user can therefore overlook the progress of the meeting from the unique view point by setting desired attributes to the coordinate axis.

When a desired rectangular parallelepiped is specified with the cursor of the mouse 4, the content of the speech information corresponding to the specified rectangular parallelepiped is displayed on, for example, a dialogue box. Therefore, the user estimates the target speech information from the overlook, and specifies the estimated rectangular parallelepiped with the mouse 4 to thereby refer to the detailed content.

As described hereinabove, according to the embodiment of the present invention, in the electronic meeting system in which a plurality of clients access the virtual space provided by the server 1 to exchange information, the speech information written in the server 1 is displayed in a properly arranged form in the space having the coordinate axis corresponding to the attribute specified by the user uniquely, thereby it is possible to overlook the speech information from various view points and to judge the progress of the meeting easily.

Next, the detailed operation of the embodiment shown in FIG. 1 is described.

To participate in the electronic meeting system, first a user starts up application software for an electronic meeting system by selecting predetermined items from a menu screen not shown in the drawing by operating the mouse 4 to log in the system.

At that time, the second analysis unit 3c detects the start up of the application for an electronic meeting system and informs of it to the communication unit 3a. As the result, the second communication unit 3a inserts the information which indicates participation registration request, transmitter, and receiver in the request shown in FIG. 3 and transmits it to the server 1.

Figure 3:
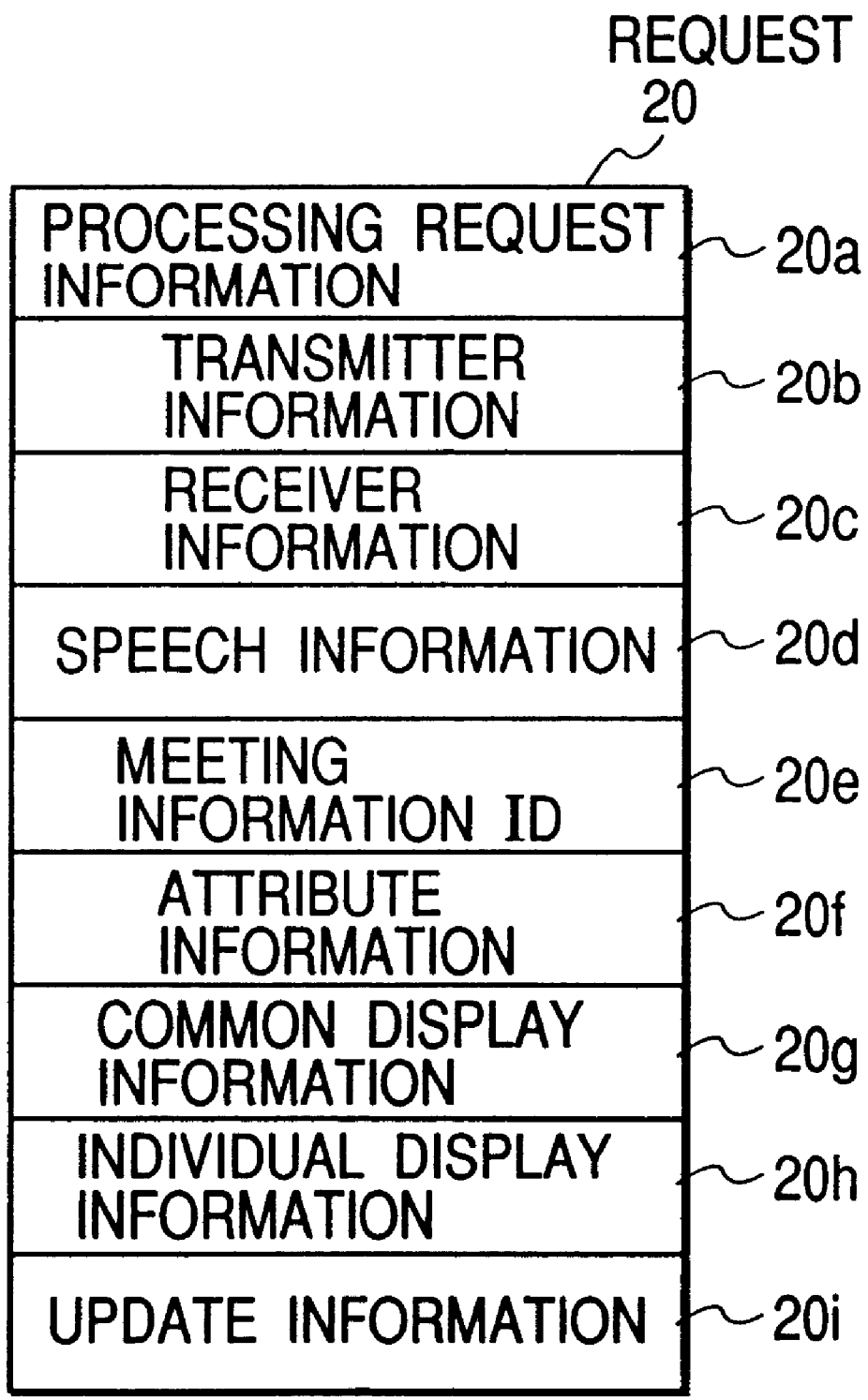
FIG. 3 is a diagram for showing the data structure of a request.

The request shown in FIG. 3 consists of a processing request information 20a, transmitter information 20b, receiver information 20c, speech information 20d, meeting information ID 20e, attribute information 20f, common display information 20g, individual display information 20h, and update information 20i. Herein, the processing request information 20a is the information for indicating the processing content which is requested to the receiver. The transmitter information 20b and the receiver information 20c are respectively the information for indicating the receiver and transmitter of the request. The speech information 20d is the information which is entered to the speech input area 10c shown in FIG. 2. The meeting information ID 20e is the information for specifying the speech information. The attribute information 20f is the attribute associated with the speech information. The common display information 20g is the information to be displayed on the common information display area 10a shown in FIG. 2. The individual display information 20h is the information to be displayed on the individual information display area 10b shown in FIG. 2. The update information 20i is the information associated with the display content to be updated. The request transmitted from the client 3 is supplied to the first analysis unit 1b by way of the first communication unit 1a of the server 1. The first analysis unit 1b extracts the processing request information 20a from the request, and recognizes that the request is the participation registration request.

Figure 4:
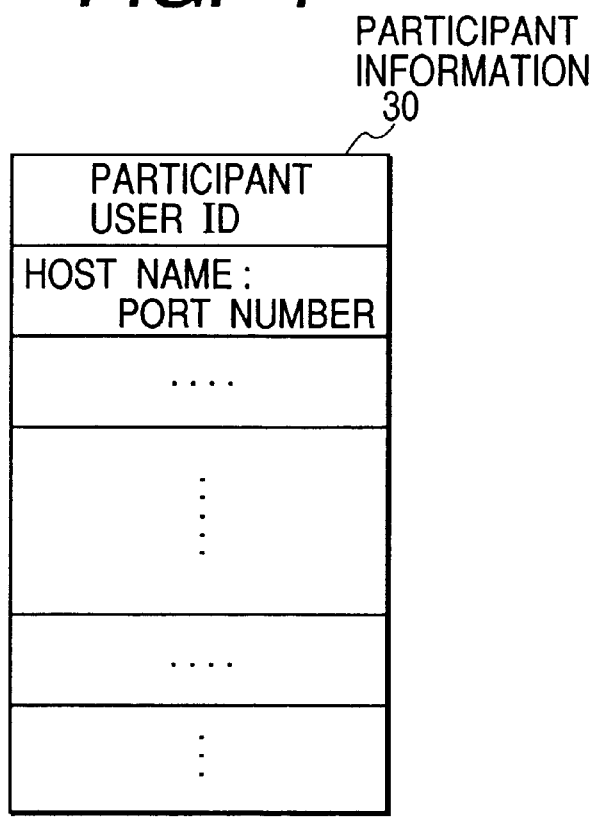
FIG. 4 is a diagram for showing an example of a participant information table.

Next, the first analysis unit 1b extracts the transmitter information 20b from the request, and supplies it to the information management unit 1d. The information management unit 1d stores the supplied transmitter information 20b in the participant information table of the first memory unit 1e. An example of the participant information table is shown in FIG. 4. In this example, meeting participants are managed by means of the user ID.

The first analysis unit 1b supplies the participation registration request and the transmitter information 20b extracted from the processing request information 20a to the information management unit 1d. As the result, the information management unit 1d acquires the meeting information which is common for meeting participants and an attribute name group extracted from all meeting information from the first memory unit 1e, and supplies them to the communication unit 1a together with the common information display request and the transmitter information.

The first communication unit 1a of the server 1 stores the common information display request, the transmitter, and receiver supplied from the information management unit 1d respectively in the processing request information 20a, the transmitter information 20b, and the receiver information 20c of the request, furthermore, stores the title of the meeting information, reception time, and corresponding meeting information ID in the common display information 20g, and stores the attribute name group in the attribute information 20f, then transmits them to the client 3.

The request transmitted by way of the network 2 is received by the second communication unit 3a of the client 3, and supplied to the second analysis unit 3c. The second analysis unit 3c extracts the processing request information 20a from the request and analyzes it to recognize that the request is the common information display request, and further extracts the common display information 20g from the request and supplies it to the display unit 3g. The second analysis unit 3c extracts the attribute group from the attribute information 20f of the request and gives it to the second attribute extraction unit 3d.

Figure 5:
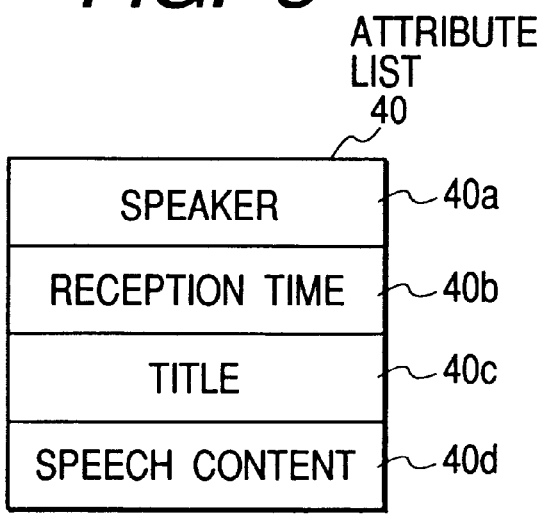
FIG. 5 is a diagram for showing an example of an attribute list.

The second attribute extraction unit 3d stores the given attribute name group as the attribute list in the second memory unit 3e. FIG. 5 shows an example of the attribute list. In this example, the attribute list 40 consists of a speaker 40a, a reception time 40b, a title 40c, and a speech content 40d.

At that time, a plurality of key words which are associated with each other such as "year and month", "date and time", "minute", "time", "time period", "time", "hour", "minute" has been stored in the second attribute extraction unit 3d, and attribute names which are coincident with any of the key word group are grouped and may be managed separately from other attribute names.

The display unit 3g displays the supplied common display information 20g on the common information display area 10a. At that time, the display unit 3g acquires the coordinate value on the screen where the respective common display information 20g are displayed, and stores the coordinate value in the display information table of the second memory unit 3e by use of the selection unit 3f.

An example of the display information is shown in FIG. 6. In this example, the display information table consists of a common screen information list and an individual screen information list, the common screen information list consists of a meeting information ID, a title, a reception time, and a coordinate (display coordinate on the screen), and on the other hand, the individual screen information list consists of a meeting information ID, a speaker, a reception time, a speech content, and a coordinate.

Because a display on the common information display area 10a shown in FIG. 2 is displayed on the display device 5 as the result of the processing described hereinabove, the user refers to the information, and can present a speech by entering the text information to the speech input area 10c by use of the mouse 4 or a key board not shown in the drawing.

In the present embodiment, an input method of text is exemplified for purpose of simple description, however, voice input or voice information in video information may be converted to text by means of a voice recognition device.

In the present embodiment, the input system (input system for electronic mail) consisting of a title, a speech content, and a speaker name is exemplified, however, the input system may consist of a title, an object, a type of speech, and a message body in which the speech content is further divided, otherwise the input system may consist of only a speech content.

Furthermore, the information which is common for all meeting participants consists of "title of meeting information" and "reception time" for the purpose of simple description, otherwise other information included in the meeting information may be displayed.

For example, the attribute name associated with time and time period may include the speech information transmission time, speech information reception time, speech start time, speech end time, speech time period, speech total time period, meeting participating time, meeting leaving time, meeting participating time period, or meeting total participating time period. Furthermore, the transmitter of speech information, title, name and nickname for specifying the speaker, contact address, age, sex, native place, position, or specialty may be added. Furthermore, the type of speech such as opinion, proposal, question, or answer, purpose of speech, speech content, meeting phase of the speech, time limit of the work arising from the speech, past speech during the meeting, meeting participants, or cited literature may be added.

Next, the user operates the transmission button 10d after the user has entered the title, speech content, and speaker name in the speech input area 10c shown in FIG. 2, the second analysis unit 3c acquires this information by way of the input unit 3b. The second analysis unit 3c groups the acquired information to form speech information, and supplies the speech information processing request to the second communication unit 3a.

The communication unit 3a stores the supplied speech information in the speech information 20d of the request, and stores the speech information processing request, transmitter, and receiver in the corresponding places of the request and transmits them to the server 1.

In the present embodiment, the speech information is expressed in the form of, for example, "title>XXX, speech content>YYY, speaker>ZZZ", these are stored in the speech information 20d of the request, and transmitted to the server 1. The structure of these requests depends on respective systems actually, however to put it simply, any structure may be used as long as the attribute and the attribute name and attribute value in each attribute can be discriminated. For example, in the case that electronic mail is used, the speech content can be discriminated from other attributes with reference to the header and body, and the attribute name is discriminated from the attribute value with reference to the mark ":".

In the server 1, the first analysis unit 1b analyzes the request received by the first communication unit 1a to thereby detect the speech information processing request, acquires the time of the detection (reception time) from a timer not shown in the drawing and supplies the time to the first attribute extraction unit 1c, simultaneously extracts the speech information 20d from the request and supplies it to the first attribute extraction unit 1c.

The first extraction unit 1c extracts the title, speech content, and speaker name, which are to be processed as the attribute name, from the supplied speech information 20d, and subsequently extracts the attribute value corresponding to each attribute name. In the present embodiment, the extraction processing is performed with discrimination between respective attributes with reference to the above-mentioned mark ":" and with discrimination between the attribute name and the attribute value with reference to the mark ">".

Furthermore, only key words are extracted by means of morpheme analysis and the extracted key words are assigned as the attribute value corresponding to the attribute name and speech content. At that time, it is desirable to drop off the score of everyday language in DF (number of documents which include a key word) by means of tf×IDF product (G. Salton, Text Information Processing (1975)) and to reduce the number of key words Next, the first attribute extraction unit 1c supplies the extracted attribute name and attribute value, reception time, speech information, and speech information processing request to the information management unit 1d. The information management unit 1d groups these meeting information in response to the speech information processing request, supplies the grouped meeting information to the first memory unit 1e, and the grouped meeting information is stored in the meeting information table in the order of time series.

An example of the meeting information table is shown in FIG. 7. In this example, "meeting information ID" is the information to specify the meeting information. "speaker" is the information to specify the speaker. "reception time" indicates the time when the speech information is received by the server 1. "title" corresponds to "title" which is entered in the speech input area 10c shown in FIG. 2. "speech content" is a key word included in the speech content. "speech information" indicates the file name of the speech information.

Generally the meeting information table may consist of the meeting information ID for specifying individual meeting information, n attributes (attribute 1 to attribute n), and the speech information for indicating the file name of the speech information as shown in FIG. 8.

Next, the information management unit 1d extracts the network address of all meeting participants registered in the participant information table (refer to FIG. 4), and supplies the extracted network address, speech information, and the attribute name included in the speech information to the first communication unit 1a together with the display information update processing request.

The first communication unit 1a generates a plurality of requests addressed to the receiver corresponding to the supplied network address, stores the speech information in the update information 20i of the respective requests, and stores the attribute name of the speech information in the attribute information 20f, furthermore stores the display information update request in the processing request information 20a. The generated requests are transmitted to the corresponding client (receiver is identical).

The request transmitted from the server 1 is received by the second transmission unit 3a of each client, and then supplied to the second analysis unit 3c. The second analysis unit 3c specifies that the requested processing is updating of the display information with reference to the processing request information 20a of the supplied request. The second analysis unit 3c extracts the speech information from the update information 20i of the request, and supplies it to the display unit 3g together with the display information update request. Furthermore at that time, the second analysis unit 3c extracts the attribute name included in the speech information from the attribute information 20f of the request, and supplies it to the second attribute extraction unit 3d.

The second attribute extraction unit 3d judges whether the supplied attribute name is stored in the attribute list of the second memory unit 3e or not, and extracts only attribute names which are not stored in the attribute list and stores them in the attribute list of the second memory unit 3e.

On the other hand, the display unit 3g extracts the required information from the supplied speech information, displays it on the common information display area 10a of the display device 5, supplies it to the second memory unit 3e, and stores it in a designated location of the display information table.

At that time, if the speech content satisfies the condition (described hereinafter) for displaying on the individual information display area 10b, then an image corresponding to this speech information is displayed on the individual information display area 10b. In detail, if the same attribute name as the attribute name currently stored in the individual screen information list of the display information table (refer to FIG. 6) of the second memory unit 3e is included in the speech information, then the selection unit 3f selects the corresponding information and supplies it to the display unit 3g, therefore the required information is displayed on the individual information display area 10b. Furthermore at that time, the displayed information is newly added to the individual screen information list of the display information table of the second memory unit 3e.

By the way, the type of information displayed on the individual information display area 10b and display form can be set arbitrarily by a user. A method for setting is described hereunder.

In the present embodiment, a user can generate upper attribute name by combining attribute names included in the attribute list stored in the second memory unit 3e. To perform such processing, first the attribute list display 50b is selected from the menu (refer to FIG. 9) displayed at the top of the individual information display area 10b, and some attribute names are specified with the right button of the mouse 4 from the displayed attribute name list (not shown in the drawing).

Figure 9:
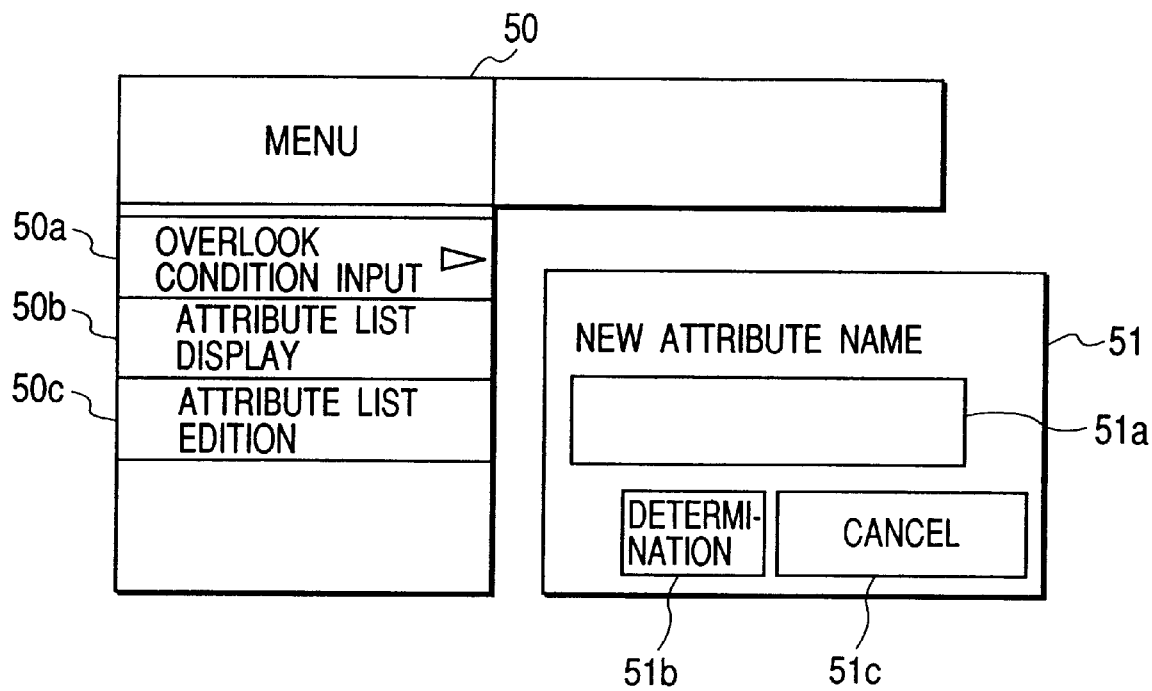
FIG. 9 is a diagram for showing a dialogue box displayed when a new attribute name is entered.

@0078 Next, the attribute list edition 50c is selected from the menu to display the dialogue box 51 shown in FIG. 9, and a suitable attribute name is entered in the text box 51a. The determining button 51b is operated when the entered information is to be selected, otherwise, if the entered information is changed to other information, then the cancel button 51c is operated.

As the result, the input new attribute name is registered as a new parent attribute name of a plurality of attribute names selected by the mouse 4 and recorded in the attribute list.

Figure 10:
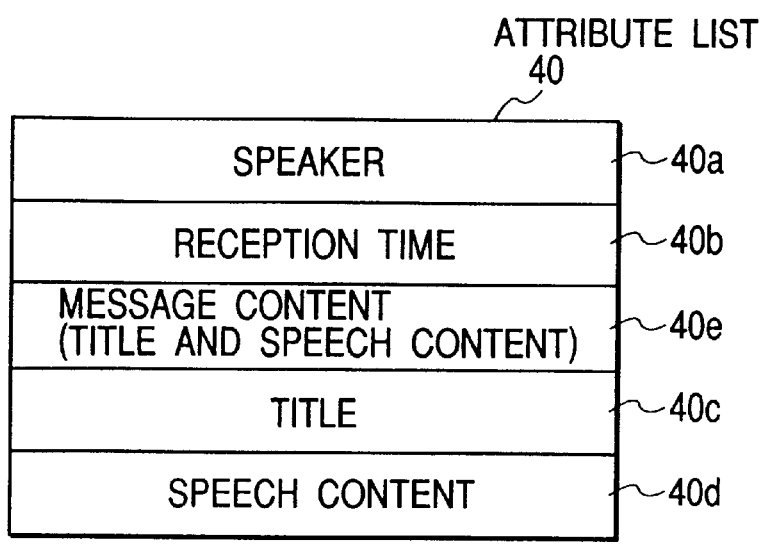
FIG. 10 is a diagram for showing an example of an attribute list.

For example, now the attribute list shown in FIG. 5 is used, the "title" and "speech content" are grouped and a new attribute name "message content" is given, then the attribute list is changed to an attribute list shown in FIG. 10. In this example, the message content 40e is newly added, and it is shown that the content consists of the title 40c and speech content 40d.

Figure 11A:
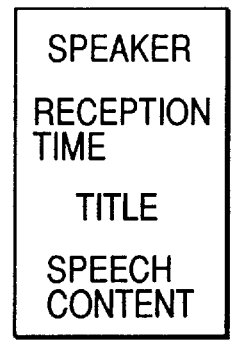
FIG. 11 is a diagram for showing the change of an attribute list when the title and the speech content are grouped to generate new attribute information.
Figure 11B:
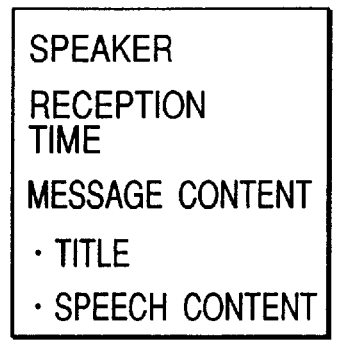

An example of comparison of the attribute name list between before edition and after edition in the case that such operation is performed is shown in FIG. 11. In detail, "title" and "speech content" which are displayed as separate attribute names before edition are grouped into a single attribute name, and the single attribute name is displayed as "message content".

In the case that attribute names are grouped to form a new parent attribute name, it is possible to display desired information on the individual information display area 10b by use of the parent attribute name as one of the axes of the display target space (details will be described hereinafter), in other words, it is possible to display a plurality of attributes on one axis.

Next, the operation performed by a user to overlook the meeting information from the unique view point is described.

Figure 12:
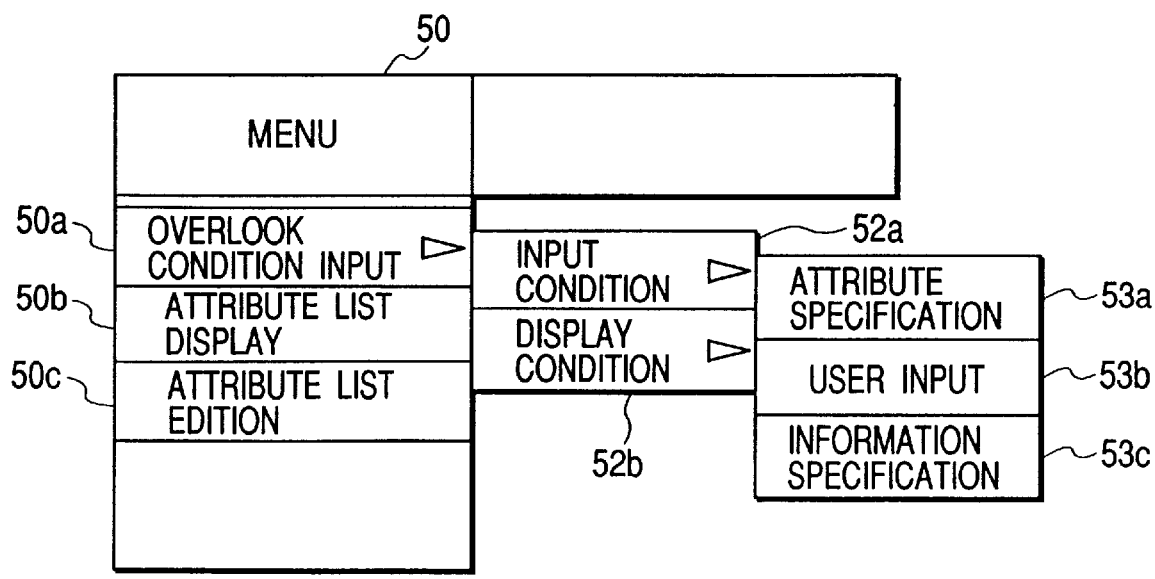
FIG. 12 is an exemplary display of a menu for displaying an attribute name list.

First, as show in FIG. 12, a user selects the overlook condition input 50a from the menu, selects the input condition 52a from the sub-menu, selects the attribute specification 53a from the sub-menu, and selects an attribute name which the user wants to overlook from the attribute name list (refer to FIG. 13) displayed on the individual information display area 10b. In the example shown in FIG. 13, a desired attribute can be specified from among the speaker, reception time, title, and speech content.

The attribute name may be selected from the key word and text information which the user has entered or text information which the user has specified. For example, in the case of key word input, the attribute name which is coincident with the input key word may be retrieved from the attribute information table, otherwise in the case of the text information entered or specified by the user, the included key word is extracted by means of morpheme analysis and an attribute name which is coincident with the key word may be extracted from the attribute information table.

Herein, in the case that the attribute name selected by the user includes an attribute name associated with time or time period, for example, a dialogue box shown in FIG. 14 is displayed on the display device 5, the time period axis for displaying the attribute value is selected from the group including "absolute time period axis", "total working time period axis", "total speech time period axis", and "total participation time period axis".

"absolute time period axis" has a display area of the entire time period ranging from the start of the meeting to the present (or end of the meeting), and the attribute value is displayed depending whether it is before or after. "total working time period axis" has a display area of the time period while the meeting participants are working, and the attribute is displayed depending whether it is before or after. Further, "total speech time period axis" has a display area of the total speech time period of respective participants, and "total speech time period axis" has a display area of the total participation time period of respective participants and the attribute value is displayed depending whether it is before or after.

In the case that an attribute name associated with time or time period, to estimate that the attribute name is an attribute name associated with time period, for example, a plurality of key words such as "year and month", "date and time", "minute", "time", "time period", "time", "hour", and "minute" are registered previously in the display information table, and estimation is performed based on whether the input attribute name is coincident with the key word or not or based on whether the attribute name includes the key word or not.

In the case that an attribute name selected by the user includes an attribute name associated with the speech content, for example, a dialogue box as shown in FIG. 15 is displayed to call upon the user to select display method of the speech content. To estimate that the attribute name includes an attribute name associated with the speech content, in the same manner as described hereinabove, for example, a plurality of key words such as "speech content", "speech body", "speech message", and "message content" are registered previously in the display information table, and estimation is performed based on whether the input attribute name is coincident with these key words or not, or based on whether the attribute name includes these key words or not.

In the dialogue box shown in FIG. 15, "display all" indicates that all key words included in the individual display information 20h transmitted from the server are displayed. "high appearance frequency", "average appearance frequency", and "low appearance frequency" indicate that key words of the number specified by the user are displayed on the speech content axis from high appearance frequency key word, average appearance frequency key word, and low appearance frequency key word respectively, wherein all the key words included in the speech content of the individual display information 20h are extracted and the appearance frequency is calculated. At that time, the method for calculating the average value may be total sum average, geometric average, or any other average calculation method. Furthermore, the displayed number of key words is not specified by a user but may be set previously to the system.

Figure 16:
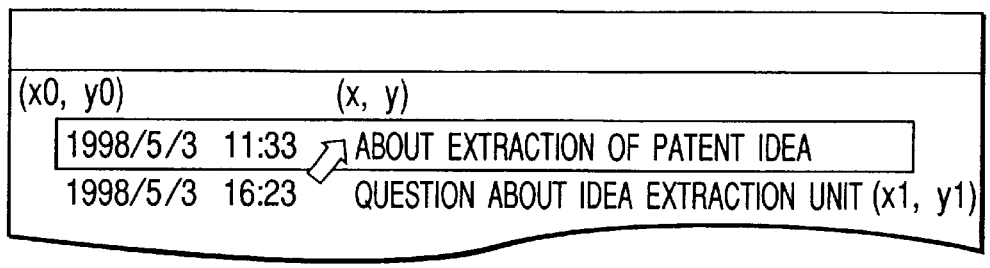
FIG. 16 is a diagram for partially showing a screen displayed when the item "past speech" is selected in the dialogue box shown in FIG. 15.
Figure 17:
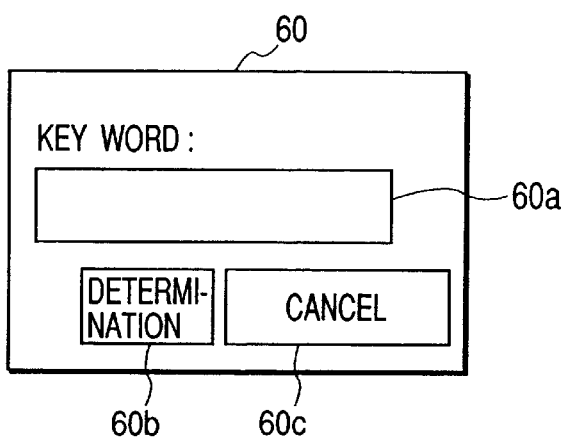
FIG. 17 is a diagram for showing an exemplary dialogue box displayed when the item "key word specification" is selected in the dialogue box shown in FIG. 15.

"newest speech" indicates that the newest meeting information is extracted from among the meeting information included in the individual display information 20h and only the key word included in the speech content is displayed on the speech content axis. "past speech" indicates that key words included in the past speech content are extracted and the extracted key words are displayed on the speech content axis. In detail, when this item is selected, the user is indicated to specify any one of the past meeting information with the mouse 4 in the common information display area 10a, key words included in the speech content of the meeting information are extracted, and displayed on the speech content axis. For example, as shown in FIG. 16, in the case that a desired item in the common information display area 10a ("about extraction of patent idea") is displayed in an area (x 0, y 0, x 1, y 1) and the cursor is located at coordinate (x, y), if the user clicks a button of the mouse 4, whether this item is selected or not is judged by judging whether (x $0 \leq x \leq x$ 1) and (y $0 \leq y \leq y$ 1) or not. The selected meeting information ID is extracted, and a key word is extracted from the speech content which is corresponding to the meeting information ID. Furthermore, "key ward specification" indicates that the key word coincident with the key word which the user has entered is extracted from the individual display information 20h and is displayed on the speech content axis. In other words, in the case that this item is selected, the dialogue box 60 shown in FIG. 17 is displayed, and when a desired key word is entered in the text box 60a and the determination button 60b is operated, then the corresponding key word is displayed on the speech content axis.

Figure 18:
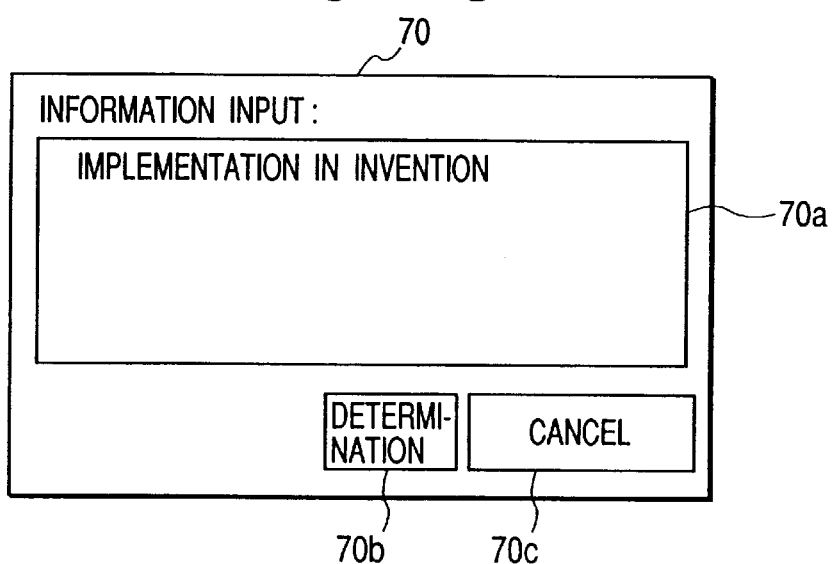
FIG. 18 is a diagram for showing an exemplary dialogue box displayed when the item "information input" is selected in the dialogue box shown in FIG. 15.

Furthermore, "information input" indicates that the key word is extracted from the text which the user has entered, and the corresponding key word is detected from the individual display information 20h and displayed on the speech content axis. In other words, in the case that this item is selected, the dialogue box 70 shown in FIG. 18 is displayed, and when a desired text is entered in the text box 70a and the determination button 70b is operated, the key word is extracted from the input text by means of morpheme analysis, and the corresponding key word is detected from the individual display information 20h and displayed on the speech content axis. For example, in this example, because the text "implementation in invention" is entered, "invention" and "implementation" are extracted as the key word.

Figure 19:
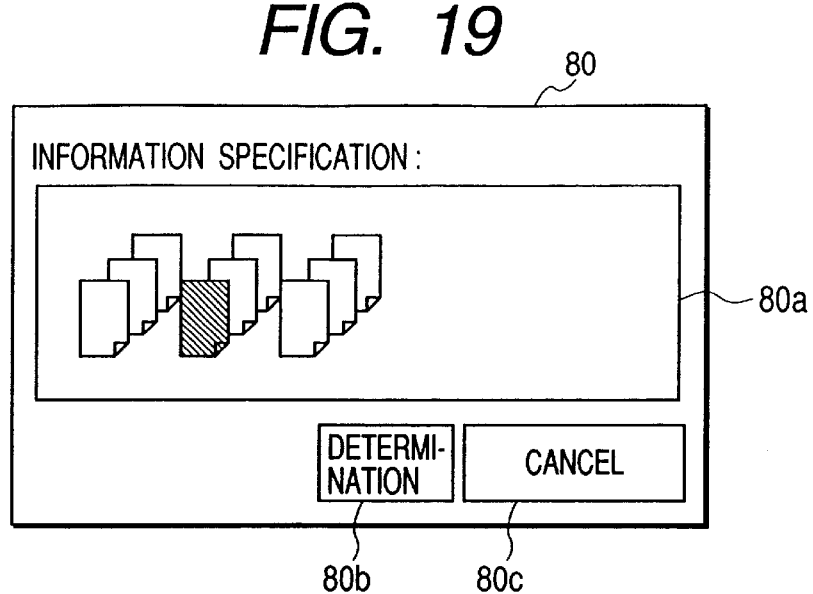
FIG. 19 is a diagram for showing an exemplary dialogue box displayed when the item "information specification" is selected in the dialogue box shown in FIG. 15.

@92 "information specification" indicates that the key word included in the text information specified by the user is extracted, and the corresponding key word is detected from the individual display information 20h and displayed on the speech content axis. In other words, in the case that this item is selected, the dialogue box 80 shown in FIG. 19 is displayed, when a desired icon is specified from among icons which indicate text information displayed in the text box 80a and the determination button 80b is operated, the key word is extracted from the corresponding text information by means of morpheme analysis, and the corresponding key word is detected from the individual display information 20h and displayed on the speech content axis.

In the above-mentioned description, only the case that input information is text information is described, however otherwise, for example, voice information is entered and recognized, and then the key word may be extracted.

As described hereinabove, it is possible to set respective coordinate axes of the overlook information displayed in the individual information display area 10b.

Figure 20:
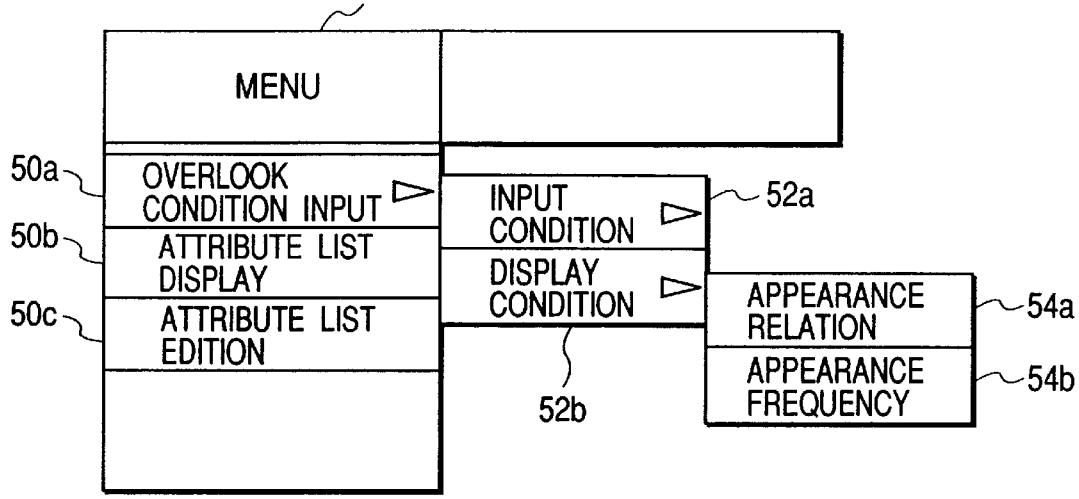
FIG. 20 is an exemplary display of a menu displayed for selecting the display condition.

In the present embodiment, two display types are available, one is "appearance relation display" in which a desired image is displayed when a cross of each attribute value (corresponding speech information) appears on the space having the axis of the attribute name selected by the user, and the other is "appearance frequency display" in which the appearance frequency element is added to the appearance relation display and the display mode (for example, display color) is changed correspondingly to the appearance frequency. To change the display type, as shown in FIG. 20, the overlook condition input 50a is selected in the menu 50 and the display condition 52b is selected in the sub-menu, then the appearance relation 54a and appearance frequency 54b are displayed and any one of these may be selected.

Next, detailed operation when the predetermined setting is completed is described hereunder. Herein, a case in which "speaker", "reception time", and "speech content" are selected as the attribute name of the coordinate, and "absolute time period axis", "appearance relation", and "high appearance frequency" are selected as the display type is described. In this case, the display number of key words of the high appearance frequency is set "5" in the dialogue box 90 shown in FIG. 21. At that time, the attribute name (speaker, reception time, and speech content) selected by a user is supplied to the second communication unit 3a together with the meeting information extraction processing request. The second communication unit 3a stores the speaker, reception time, and speech content selected by the user in the attribute information 20f, and stores the meeting information extraction processing request in the processing request information 20a, further transmits the request generated by adding the transmitter information 20b and the receiver information 20c to the server 1.

In the server 1, the first communication unit 1a receives the request, and supplies it to the first analysis unit 1b. The first analysis unit 1b detects that the request requests the meeting information extraction processing by referring to the processing request information 20a, and extracts the transmitter information, meeting information extraction processing request, and attribute name selected by the user of the client side and supplies to the information management unit 1d.

The information management unit 1d extracts respective meeting information ID from the meeting information table of the first memory unit 1e correspondingly to the meeting information extraction processing request, and acquires the speaker, reception time, and attribute of the speech content corresponding to the respective meeting information ID and supplies to the first communication unit 1a.

The first communication unit 1a stores the meeting information ID, attribute name, and attribute value in the individual display information 20h, stores the individual information display request in the processing request information 20a, and further stores other required items to generate the request and transmits to the client 3.

In the client 3, the second communication unit 3a receives the request, and supplies it to the second analysis unit 3c. The second analysis unit 3c detects that the request requests the individual information display processing by referring to the processing request information 20a, and extracts the individual display information 20h and supplies to the second attribute extraction unit 3d.

The second attribute extraction unit 3d stores the attribute value supplied from the second analysis unit 3c in the individual information display list of the second memory unit 3e.

The selection unit 3f permutates key words included in the total speech content in the order of appearance frequency from the highest, and selects 5 highest appearance frequency key words and supplies to the display unit 3g. The reason why 5 highest appearance frequency key words are selected is that a value "5" is set in the dialogue box 90 shown in FIG. 21.

The display unit 3g displays the speaker name on the speaker axis, the attribute value of the reception time period on the absolute time period axis, and 5 key words of the highest appearance frequency on the speech content axis. Entries which include these key words are retrieved from among entries stored in the individual display list, and if the corresponding entries are found, then the attribute values namely the speaker and the reception are acquired and, for example, "rectangle" is displayed in the predetermined area on the coordinate axis correspondingly to these values.

Figure 22:
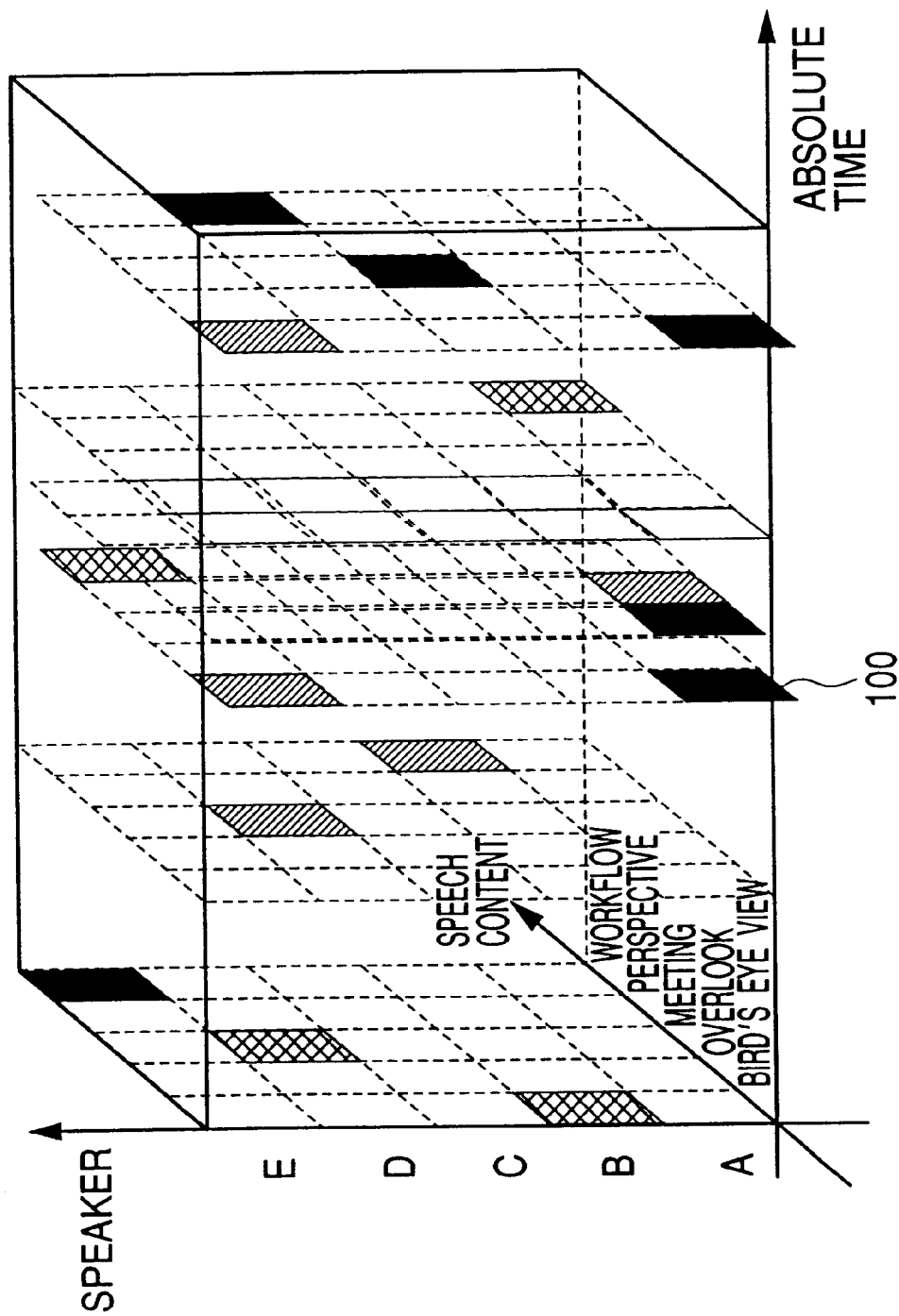
FIG. 22 is a diagram for showing an example of an image information displayed in the individual information display area.

As the result, an image as shown in FIG. 22 is displayed on the individual information display area 10b. In this example, "absolute time period", "speaker", and "speech content" are displayed as the coordinate axis. Speakers A to E are displayed as the attribute value of the speaker. Furthermore, as the attribute value of the speech content, "bird's eye view", "overlook", "meeting", "perspective", and "workflow", which are the highest appearance frequency key words, are displayed. If the speech which includes any one of these key words is found, a rectangle is displayed at the position corresponding to the time when the speech was received and the speaker who spoke the speech. By referring to such a display, the user can overlook the temporal progress of the high appearance frequency key words included in the speech of the meeting participants.

In the present embodiment, for the purpose of simple description, a method in which a user specifies desired attribute names from the attribute name list directly is employed as the method in which n attribute names are specified from among a plurality of attribute names extracted from all speech information by a user, however other methods may be employed.

Figure 23:
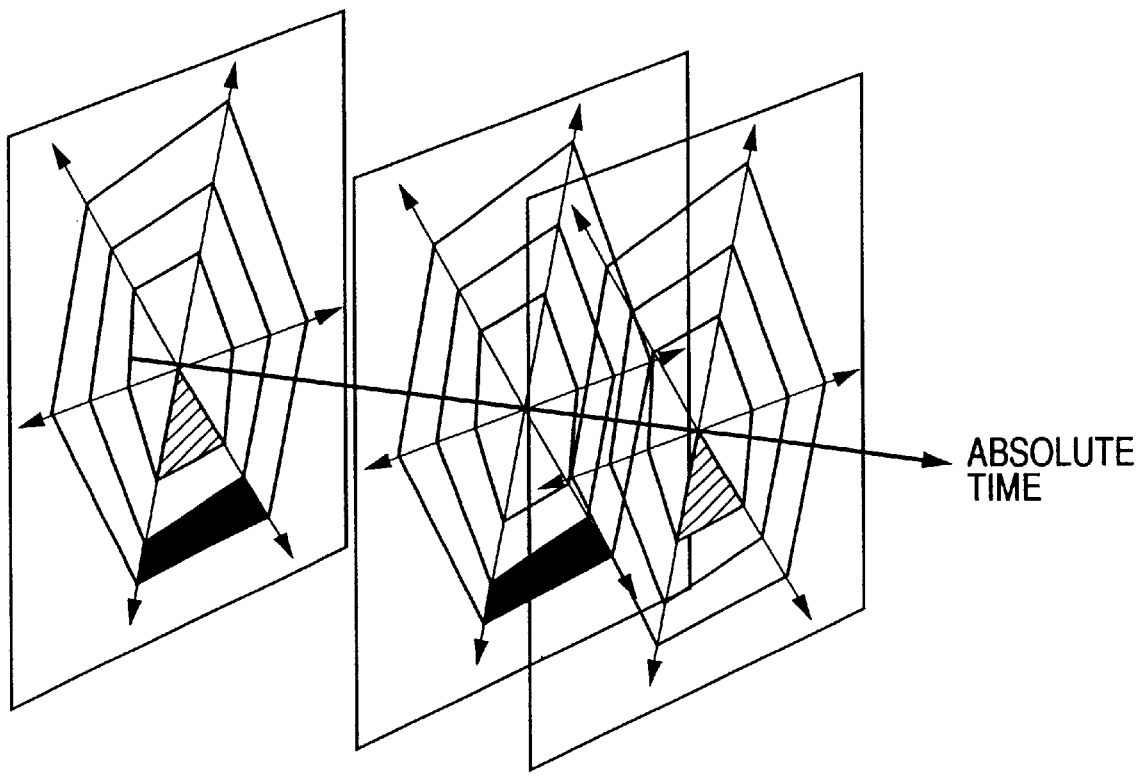
FIG. 23 is a diagram for showing another example of image information displayed in the individual information display area.

In the above-mentioned embodiment, the absolute time period axis is provided to the two-dimensional plane having the speaker and speech content as the axis and the temporal change of the two-dimensional plane is displayed, however, for example, the two-dimensional plane may be structured with the axis of the maximum number of (number of attributes minus 1). For example, in the case that the meeting information has at most 7 attributes, the display type as shown in FIG. 23 may be employed.

In the above-mentioned embodiment, the case that three attributes are selected and the meeting information is displayed in a three-dimensional space is described, however in the case that one attribute name is selected, the meeting information may be displayed on a one-dimensional axis, and in the case that two-attribute names are selected, the meeting information may be displayed on a two-dimensional plane. Furthermore, in the case that four or more attributes are selected, the above-mentioned display type (refer to FIG. 23) may be employed, or a plurality of attributes are grouped into one parent attribute to display the meeting information.

Next, the processing for referring the detailed speech content from the image (for example, FIG. 22) displayed as described hereinabove is described.

When a user operate the left button of the mouse 4 to specify one point on the individual information display area 10b, the second analysis unit 3c acquires the coordinate (x, y, z) of the point from the input unit 3b, and judges that the coordinate corresponds which meeting information.

Figure 24:
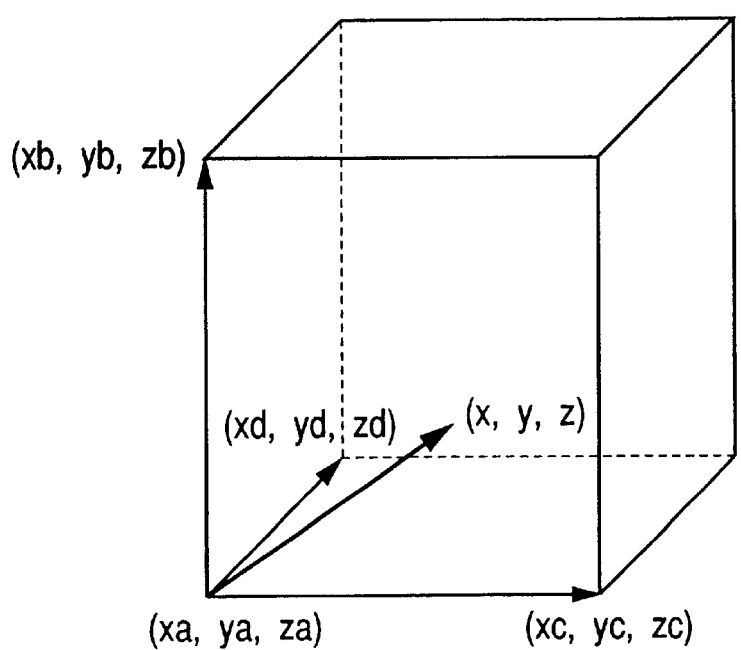
FIG. 24 is a diagram for showing a coordinate system set for acquiring meeting information corresponding to a point when the desired point in the individual information display area is specified by use of a mouse.

At that time, the display range of a meeting information is defined, for example, as shown in FIG. 24, and to judge whether the coordinate (X, Y, Z) specified by the user specifies this meeting information or not, for example, parameters k, l, m, and n of the equation (1) described hereunder is calculated and then whether 0<k, l, m, n<1 holds or not is judged.

[Equation 1]

$$\begin{pmatrix} x \\ y \\ z \end{pmatrix} = k \begin{pmatrix} x_a \\ y_a \\ z_a \end{pmatrix} + l \begin{pmatrix} x_b \\ y_b \\ z_b \end{pmatrix} + m \begin{pmatrix} x_c \\ y_c \\ z_c \end{pmatrix} + n \begin{pmatrix} x_d \\ y_d \\ z_d \end{pmatrix} \quad (1)$$

If the desired meeting information is displayed in the coordinate specified by the user, the second analysis unit 3c acquires the corresponding meeting information ID from the second memory unit 3e by way of the second attribute extraction unit 3d and supplies it to the second communication unit 3a together with the speech information extraction request.

The second communication unit 3a stores the meeting information ID, speech information extraction request, transmitter information, and receiver information in predetermined locations in the request and transmits to the server 1.

In the server 1, the first analysis unit 1b detects that the request is a speech information extraction request, and extracts the meeting information ID from the request and supplies to the information management unit 1d. The information management unit 1d acquires the speech information having the same meeting information ID from the first memory unit 1e, and supplies it to the first analysis unit 1b.

The first analysis unit 1b supplies the speech information display request, speech information, and transmitter information to the first communication unit 1a. The first communication unit 1a stores these supplied information in predetermined locations in the request and returns to the client 3.

In the client 3, the second analysis unit 3c acquires the speech information from the returned request and supplies to the display unit 3g, and the speech information is displayed on the display device 5.

According to the above-mentioned processing, the cursor of the mouse 4 is moved to the rectangle (refer to FIG. 22) displayed on the individual information display area 10b and the left button is operated, as the result the speech content is displayed on the screen.

Figure 25:
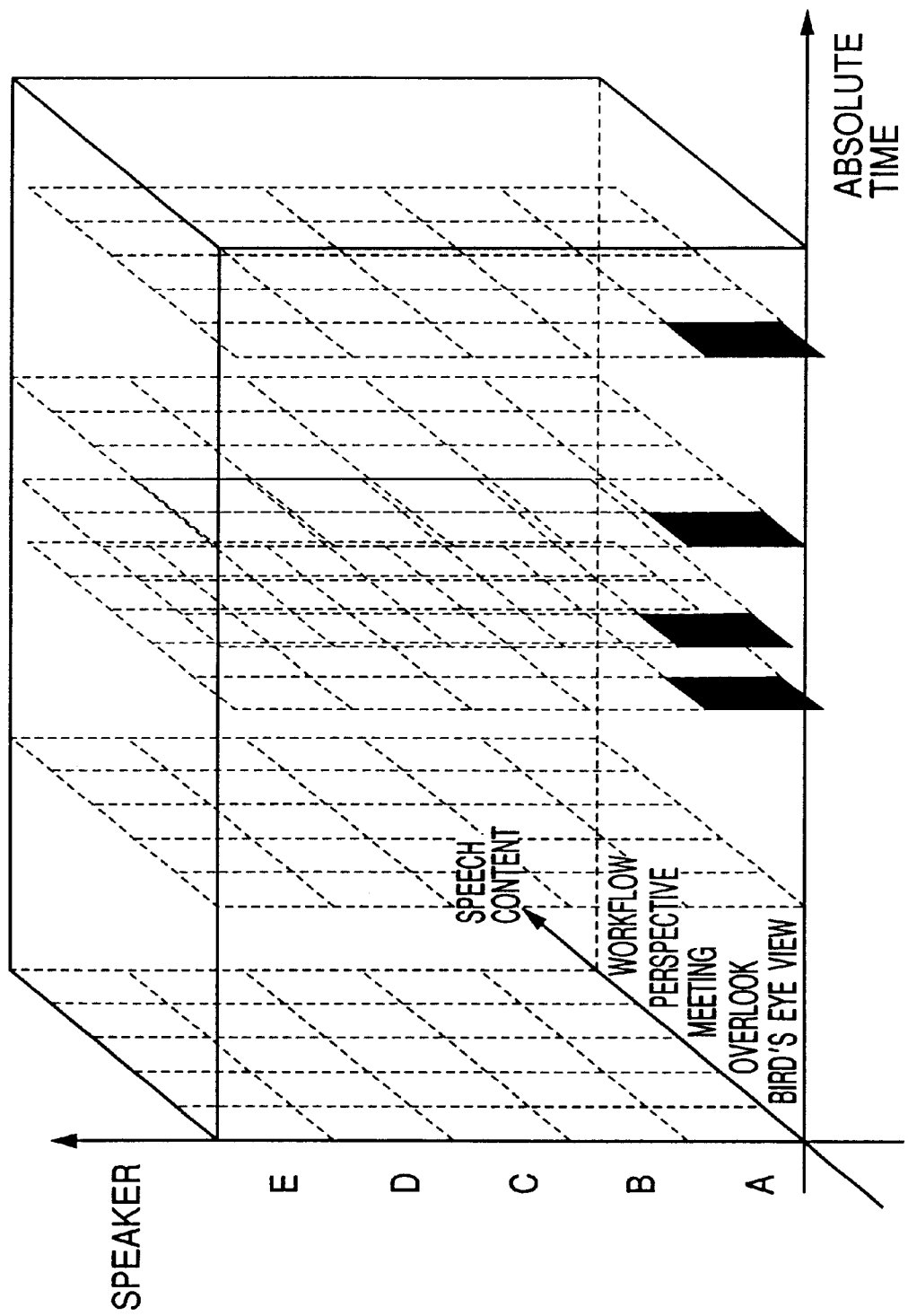
FIG. 25 is an exemplary display of a screen displayed when a rectangle 100 is right-clicked in FIG. 22.

The cursor of the mouse 4 is moved to the rectangle displayed on the individual information display area 10b, and if the right button is operated, the attribute value group of the time other than the specified meeting information is acquired and the meeting information having the same attribute value group is acquired, and such meeting formation is displayed in the order of time series. For example, when the cursor of the mouse 4 is moved to the rectangle 100 shown in FIG. 22 and the right button is operated, only the meeting information having the same attribute value (speaker is A and the key word is "overlook") as the rectangle 100 is displayed as shown in FIG. 25.

According to such structure, it is possible to display only the information having the same attribute value as a certain meeting information on a screen, therefore the operability in the case that many information is displayed is improved.

Figure 26:
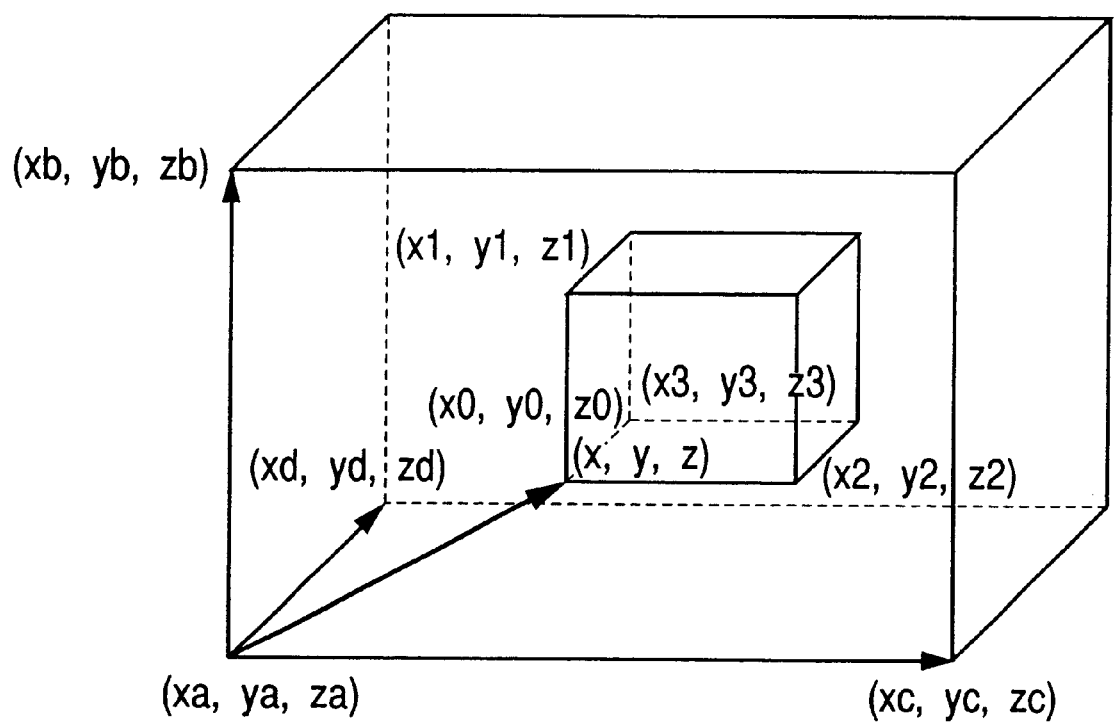
FIG. 26 is a diagram for showing a coordinate system set for acquiring meeting information corresponding to an area when the desired area in the individual information display area is specified by use of a mouse.

By the way, when a user specifies a desired area with keeping the left button of the mouse 4 pushed in the individual information display area 10b, the input unit 3b acquires the coordinate values (xa, ya, za, xb, yb, zb, xc, yc, zc, xd, yd, zd) of the areas as shown in FIG. 26.

The respective coordinates of vertexes (x0, y0, z0) (x1, y1, z1), (x2, y2, z2), and (x3, y3, z3) in the space area where the meeting information is displayed are designated as (x, y, z), the second analysis unit 3c judges whether all the coordinates satisfy the condition of the equation (1) or not, and the meeting information ID of the meeting information included in the specified area is acquired. In other words, the meeting information ID of the meeting information included entirely in the specified area (enclosed) is acquired.

Next, by operating the same processing as in the case that one point in the area is specified, the speech information corresponding to the meeting information ID is acquired from the server 1 and displayed on the screen.

Furthermore, when a user specifies a desired area with keeping the right button of the mouse 4 pushed in the individual information display area 10b, by performing the same processing as described hereinabove, the attribute value group included in the area is acquired and the meeting information having the same attribute value group as that is acquired, and the meeting information is displayed in the order of time series.

Figure 27:
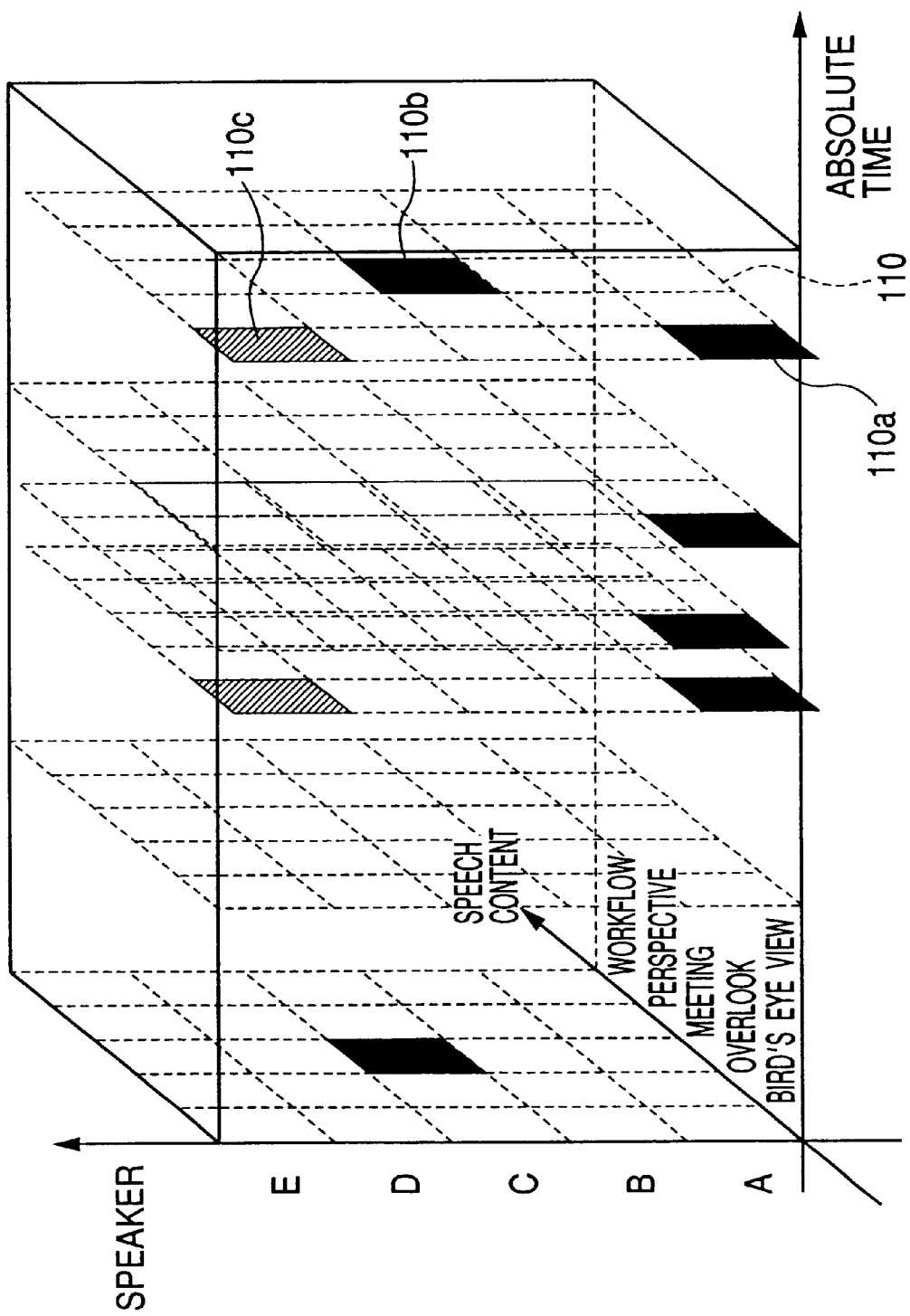
FIG. 27 is an exemplary display of a screen displayed when rectangle group 110a to 110c is right-clicked in FIG. 22.

For example, when a user specifies the area including the plane 110 displayed on the right end of the FIG. 27 with keeping the right button of the mouse 4, because rectangles 110a, 110b, and 110c are included in this area, rectangles corresponding to the meeting information having the same attribute value as these respective rectangles 110a to 110c are displayed on the screen.

According to the present embodiment, because other meeting information having the same attribute value group as the meeting information included in the specified area can be displayed selectively and the limited display items can be displayed, the operation efficiency is improved.

In the above-mentioned embodiment, only the case that the speech information comprises the text information is described, however, the case that the speech information comprises voice or image is also accommodable, the information other than the text information can be dealt with by providing a unit for reproducing these information.

The view point for overlooking the coordinate displayed on the individual information display area 10b may be suitably changeable. For example, the coordinate is overviewed from a desired vertex in the three-dimensional space, or overviewed from a desired plane in the three-dimensional space.

When a user performs an operation for ending the application software of the electronic meeting system, the second communication unit 3a generates a request which includes the leave request, transmitter, and receiver and transmits it to the server 1.

In the server 1, the first communication unit 1a receives the request, and the first analysis unit 1b detects that this request is a leave request. The information management unit 1d extracts the transmitter information from the request, and deletes the transmitter information included in the first memory unit 1e. As the result, the user who has ended the application software leaves the meeting.

Finally, details of respective processing performed in the server and the client 3 of the embodiment shown in FIG. 1 will be described hereinafter with reference to the flowcharts.

Figure 28:
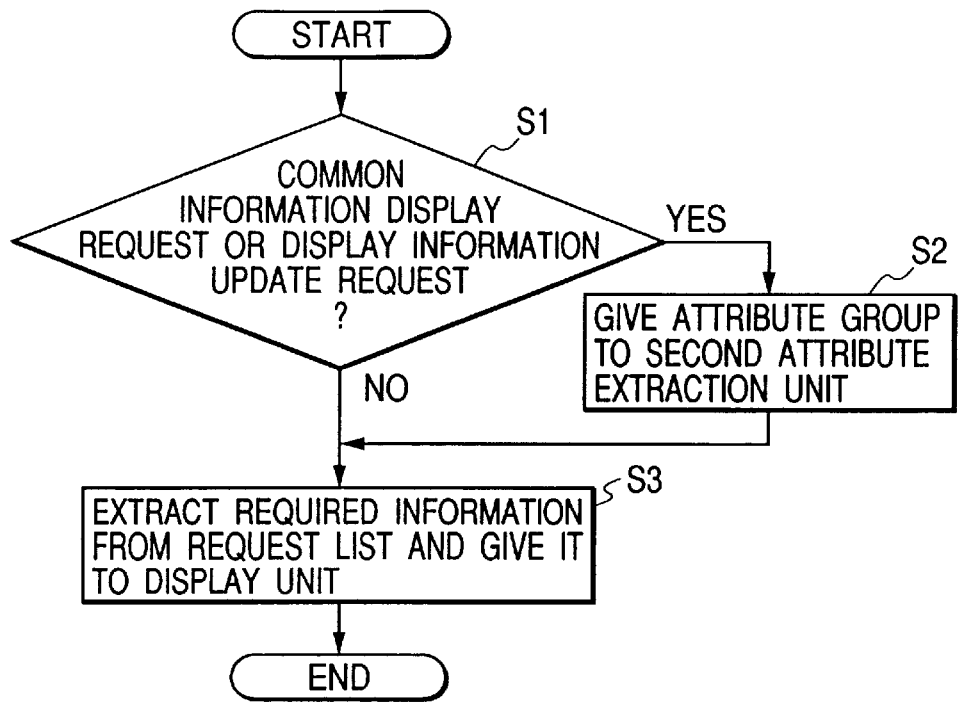
FIG. 28 is a flowchart for describing exemplary processing which the second analysis unit of a client performs.

FIG. 28 is a flowchart for describing an example of processing performed by the second analysis unit 3c of the client 3. When the flowchart starts, the processing described hereunder is performed.

[S1] In judgement by the second analysis unit 3c, if the processing request information 20a included in the request supplied from the second communication unit 3a is a common information display request or a display information update request, then the sequence proceeds to step S2, and otherwise the sequence proceeds to step S3.

[S2] The second analysis unit 3c supplies the attribute group stored in the attribute information 20f included in the request to the second attribute extraction unit 3d.

[S3] The second analysis unit 3c extracts required information from the request and supplies to the display unit 3g, and the processing is ended.

Figure 29:
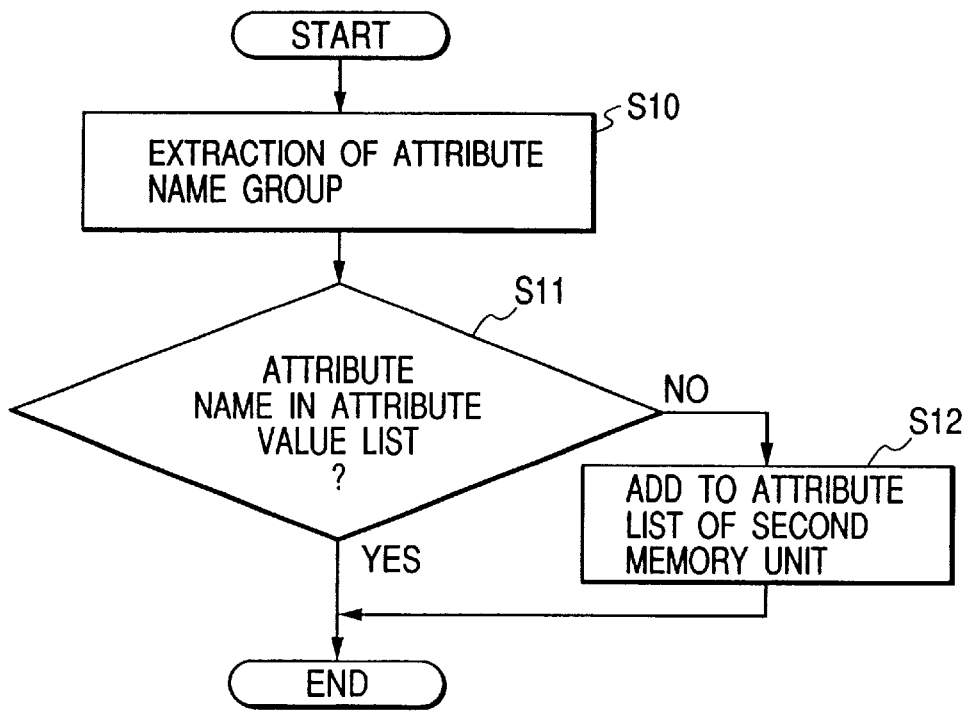
FIG. 29 is a flowchart for describing exemplary processing which the second attribute extraction unit of a client performs.

Next, an example of processing performed by the second attribute extraction unit 3d of the client 3 is described with reference to FIG. 29. When this flowchart is started, the processing described hereunder is performed.

[S10] The second attribute extraction unit 3d extracts the attribute name from the attribute group supplied from the second analysis unit 3c.

[S11] The second extraction unit 3d judges whether all the extracted attribute names are included in the attribute list, and if all the extracted attribute names are not included, then the sequence proceeds to step S12, and otherwise the processing is brought to an end.

[S12] The second attribute extraction unit 3d adds the attribute name which is judged to be not included in the attribute list stored in the second memory unit 3e in step S11.

Next, an example of processing performed by the second analysis unit 3c and the display unit 3g of the client 3 is described with reference to FIG. 30. When this flowchart is started, the processing described hereunder is performed.

[S20] The second analysis unit 3c judges whether an input operation from a user is generated, as the result, if the input operation from the user is judged to be generated, then the sequence proceeds to step S26, and otherwise (request from the server 1 is generated) the sequence proceeds to step S21.

[S21] In the processing in the second analysis unit 3c, if the request supplied from the second communication unit 3a is a common information display request, then the sequence proceeds to step S22, and otherwise the sequence proceeds to step S23.

[S22] The display unit 3g performs the common information display processing. The details of this processing are described hereinafter with reference to FIG. 31.

[S23] In the processing in the second analysis unit 3c, if the request supplied from the second communication unit 3a is a display information update request, the sequence proceeds to step S24, and otherwise the sequence proceeds to step S25.

[S24] The display unit 3g performs the display information update processing. Details of this processing is described hereinafter with reference to FIG. 32.

[S25] The display unit 3g performs the individual information display processing. The details of this processing are described hereinafter with reference to FIG. 33.

[S26] In the processing in the second analysis unit 3c, if the information supplied from the input unit 3b is a speech information generation request, then the sequence proceeds to step S27, and otherwise the sequence proceeds to step S28.

[S27] The second analysis unit 3c performs the speech information generation processing. The details of this processing are described hereinafter with reference to FIG. 34.

[S28] In the processing in the second analysis unit 3c, if the information supplied from the input unit 3b is an attribute list edition request, then the sequence proceeds to step S29, and otherwise the sequence proceeds to step S30.

[S29] The second analysis unit 3c performs the attribute list edition processing. The details of this processing are described hereinafter with reference to FIG. 35.

[S30] In the processing in the second analysis unit 3c, if the information supplied from the input unit 3b is a speech information display request, then the sequence proceeds to step S31, and otherwise the sequence proceeds to step S32.

[S31] The display unit 3g performs the speech information display processing. The details of this processing are described hereinafter with reference to FIG. 36.

[S32] The second analysis unit 3c performs the speech information extraction processing. The details of this processing are described hereinafter with reference to FIG. 36.

Figure 30:
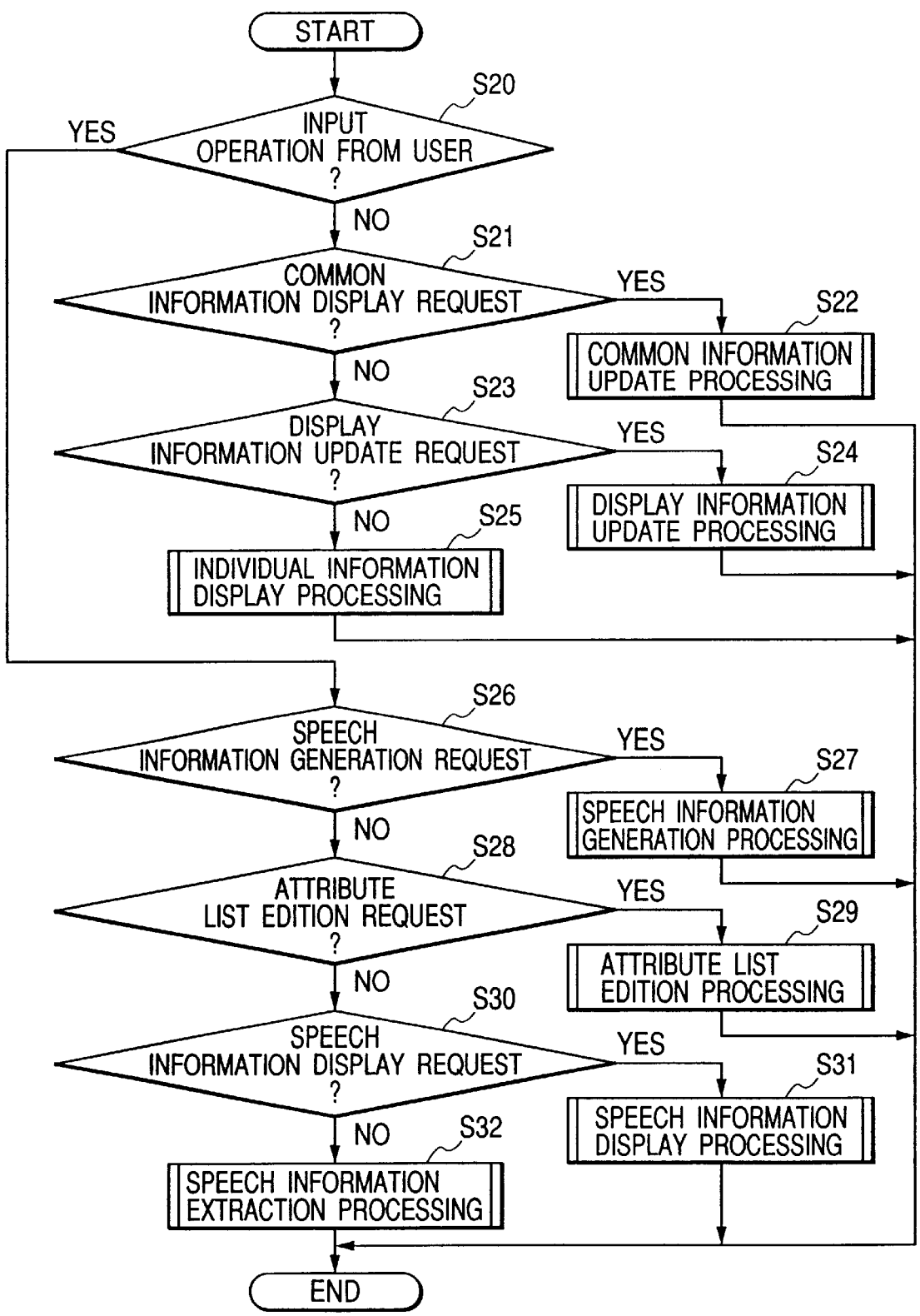
FIG. 30 is a flowchart for describing an exemplary processing which the second analysis unit and display unit of a client perform.
Figure 31:
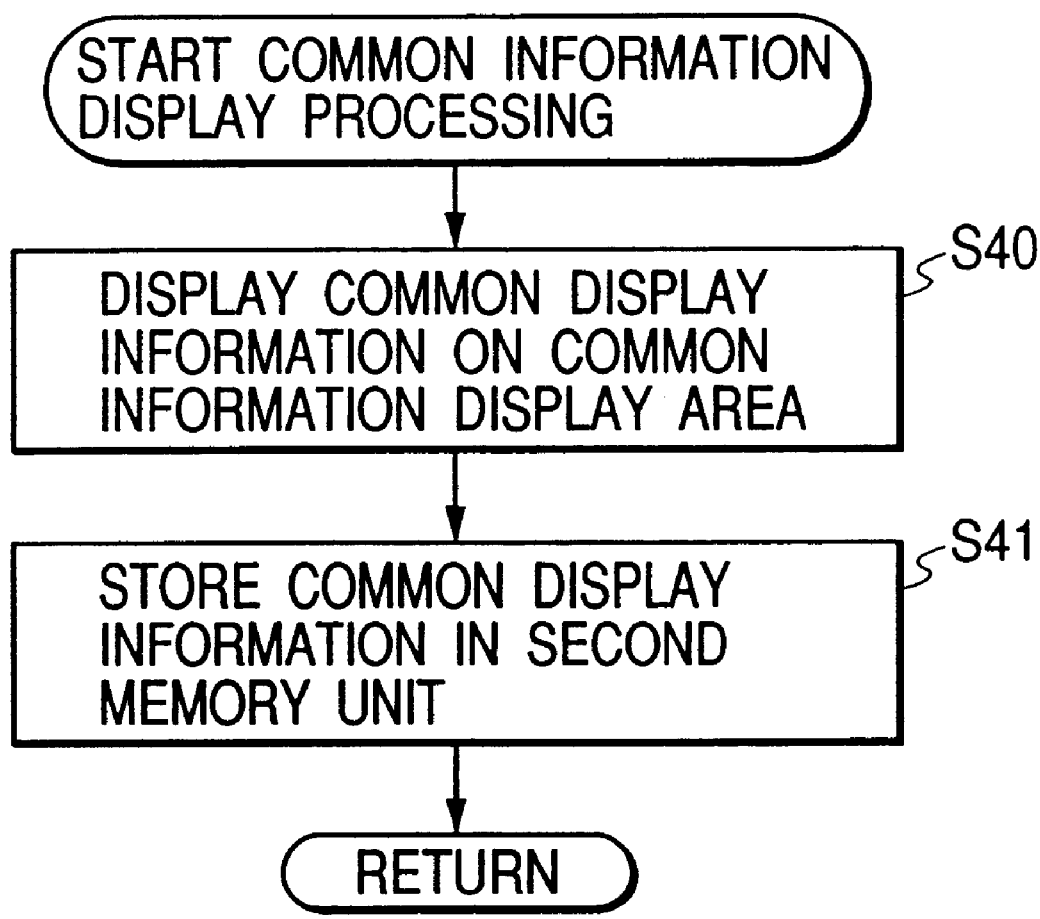
FIG. 31 is a flowchart for describing the details of "common information display processing" shown in FIG. 30.

Next, details of "common information display processing" in step S22 shown in FIG. 30 is described with reference to FIG. 31. When this flowchart is started, the processing described hereunder is performed.

[S40] The display unit 3g displays the common display information supplied from the second analysis unit 3c in the common information display area 10a of the display device 5.

[S41] The display unit 3g supplies the common display information to the second memory unit 3e by way of the selection unit 3f and stores in the common screen information list of the display information table. Then the sequence returns to the original processing.

Figure 32:
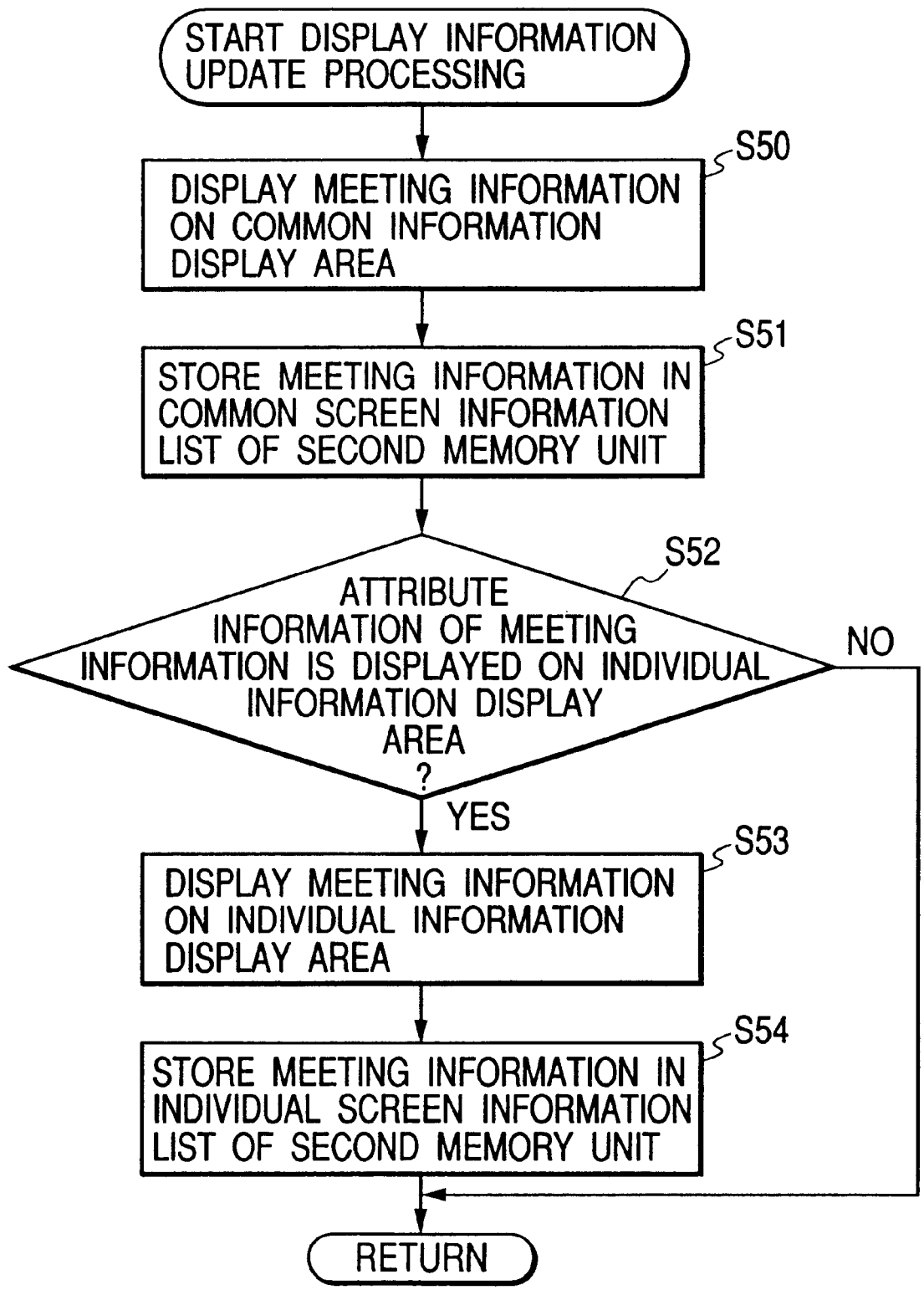
FIG. 32 is a flowchart for describing the details of "display information update processing" shown in FIG. 30.

Next, the details of "display information update processing" in step S24 shown in FIG. 30 are described with reference to FIG. 32. When this flowchart is started, the processing described hereunder is performed.

[S50] The display unit 3g displays the meeting information in the common information display area 10a of the display device 5.

[S51] The display unit 3g stores the meeting information in the common screen information list of the second memory unit 3e by way of the selection unit 3f.

[S52] In the display unit 3g, if the attribute information of the meeting information is displayed in the individual information display area 10b, then the sequence proceeds to step S53, and otherwise the sequence returns to the original processing.

[S53] The display unit 3g displays the meeting information in the individual information display area 10b of the display device 5.

[S54] The display unit 3g supplies the displayed meeting information to the second memory unit 3e by way of the selection unit 3f and stores in the individual screen information list. Then the sequence returns to the original processing.

Figure 33:
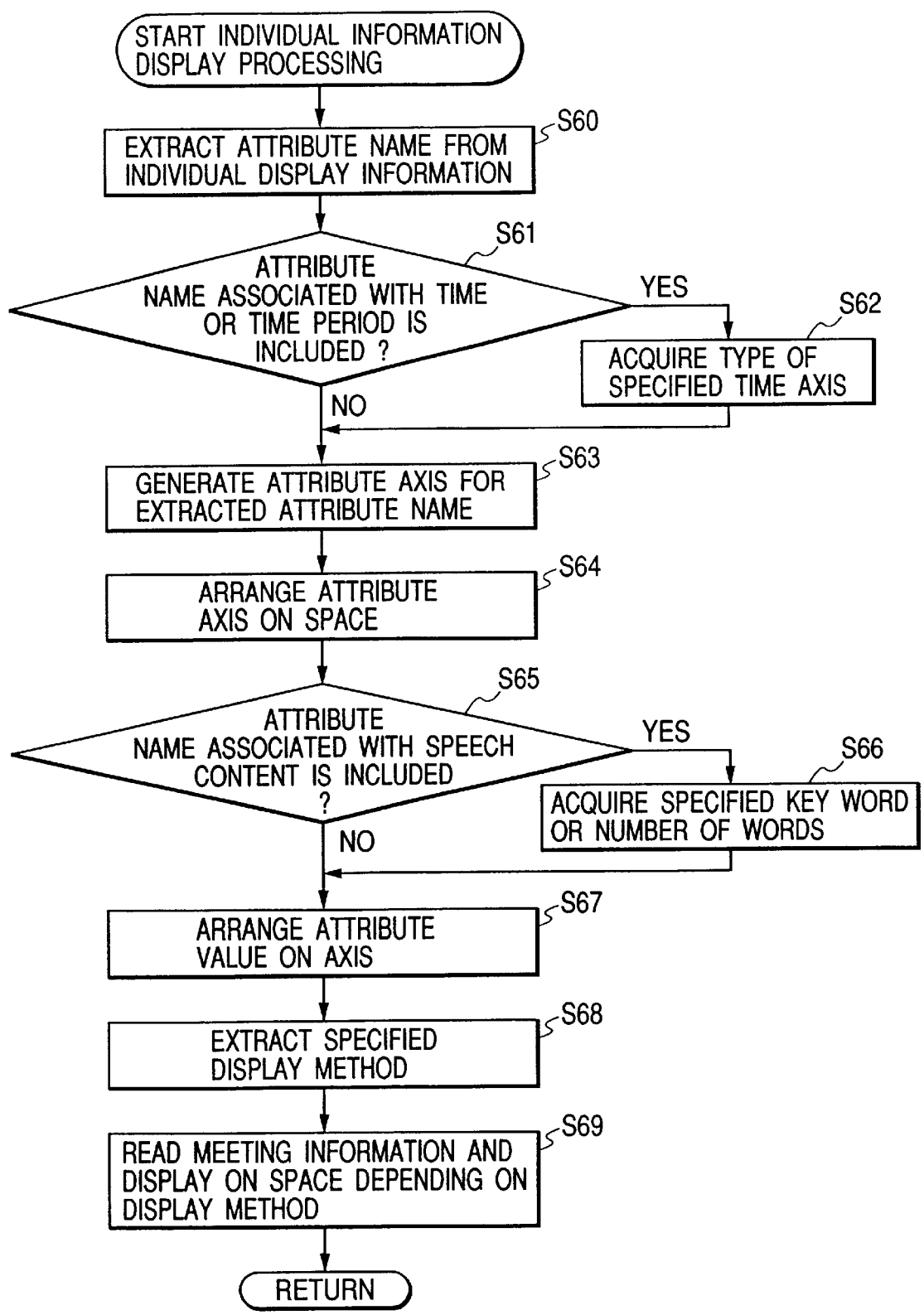
FIG. 33 is a flowchart for describing the details of "individual information display processing" shown in FIG. 30.

Next, the details of "individual information display processing" in step S25 shown in FIG. 30 are described with reference to FIG. 33. When this flowchart is started, the processing described hereunder is performed.

[S60] The second analysis unit 3c extracts the attribute name from the individual display information 20h.

[S61] In the processing in the second analysis unit 3c, if an attribute name associated with time or time period is included in the attribute name extracted in step S60, then the sequence proceeds to step S62, and otherwise the sequence proceeds to step S63.

[S62] The second analysis unit 3c acquires the time axis type specified in the dialogue box shown in FIG. 14.

[S63] The second analysis unit 3c generates the attribute axis for extracted attribute names.

[S64] The second analysis unit 3c controls the display unit 3g to display the attribute axis in the individual information display area 10b of the display device 5.

[S65] In the processing in the second analysis unit 3c, if an attribute name associated with the speech content is included in the attribute name extracted in step S60, then the sequence proceeds to step S66, and otherwise the sequence proceeds to step S67.

Figure 21:
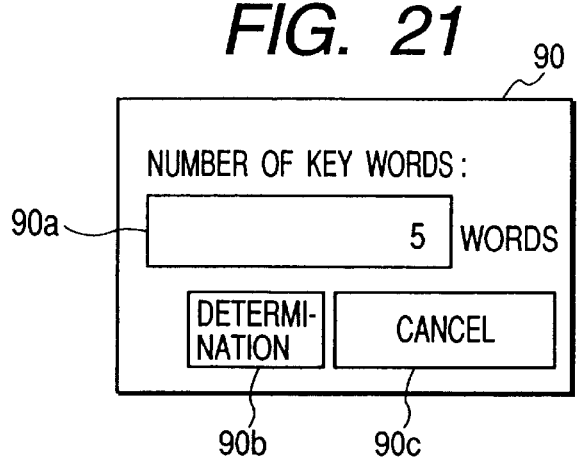
FIG. 21 is an exemplary dialogue box displayed for setting the number of key words.

[S66] The second analysis unit 3c acquires the key words which have been specified in the dialogue box shown in FIG. 17 to FIG. 19 or the number of key words which have been entered in the dialogue box shown in FIG. 21.

[S67] The second analysis unit 3c controls the display unit 3g to locate the attribute value on the attribute axis displayed in step S64.

[S68] The second analysis unit 3c acquires the display method set on the menu screen shown in FIG. 20.

[S69] The second analysis unit 3c controls the display unit 3g depending on the acquired display method to display the meeting information in the individual information display area 10b.

Next, the details of "speech information generation processing" in step 27 shown in FIG. 30 are described with reference to FIG. 34. When this flowchart is started, the processing described hereunder is performed.

[S70] The second analysis unit 3c supplies to the second communication unit 3a the speech information and speech information processing request supplied from the input unit 3b. Then the sequence returns to the original processing. As the result, the second communication unit 3a transmits the request which includes the speech information and the speech information processing request to the server 1.

Next, the details of "attribute list edition processing" in step S29 shown in FIG. 30 are described with reference to FIG. 35. When this flowchart is started, the processing described hereunder is performed.

[S80] The display unit 3g reads out the attribute list from the second memory unit 3e and displays on the display device 5 as the attribute name list.

[S81] The display unit 3g displays the menu as shown in FIG. 9 and receives a new attribute name input. Then the attribute name list is updated correspondingly to the input new attribute name.

[S82] The second analysis unit 3c supplies the attribute name which has been updated in step S81 to the second memory unit 3e to update the attribute list. Then the sequence returns to the original processing.

Figure 36:
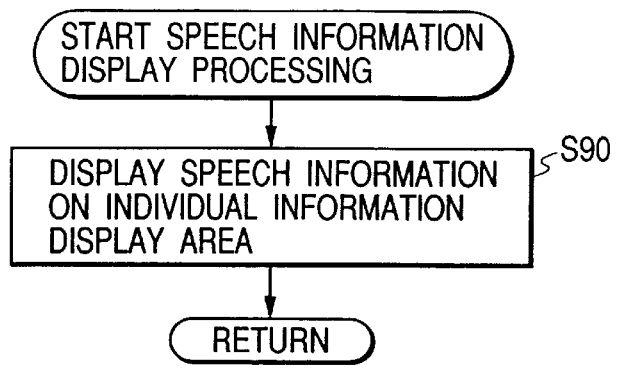
FIG. 36 is a flowchart for describing the details of "speech information display processing" shown in FIG. 30.

Next, the details of "speech information display processing" in step S31 shown in FIG. 30 are described with reference to FIG. 36. When this flowchart is started, the processing described hereunder is performed.

[S90] The display unit 3g displays the speech information supplied from the input unit 3b by way of the second analysis unit 3c on the display device 5. Then the sequence returns to the original processing.

Figure 37:
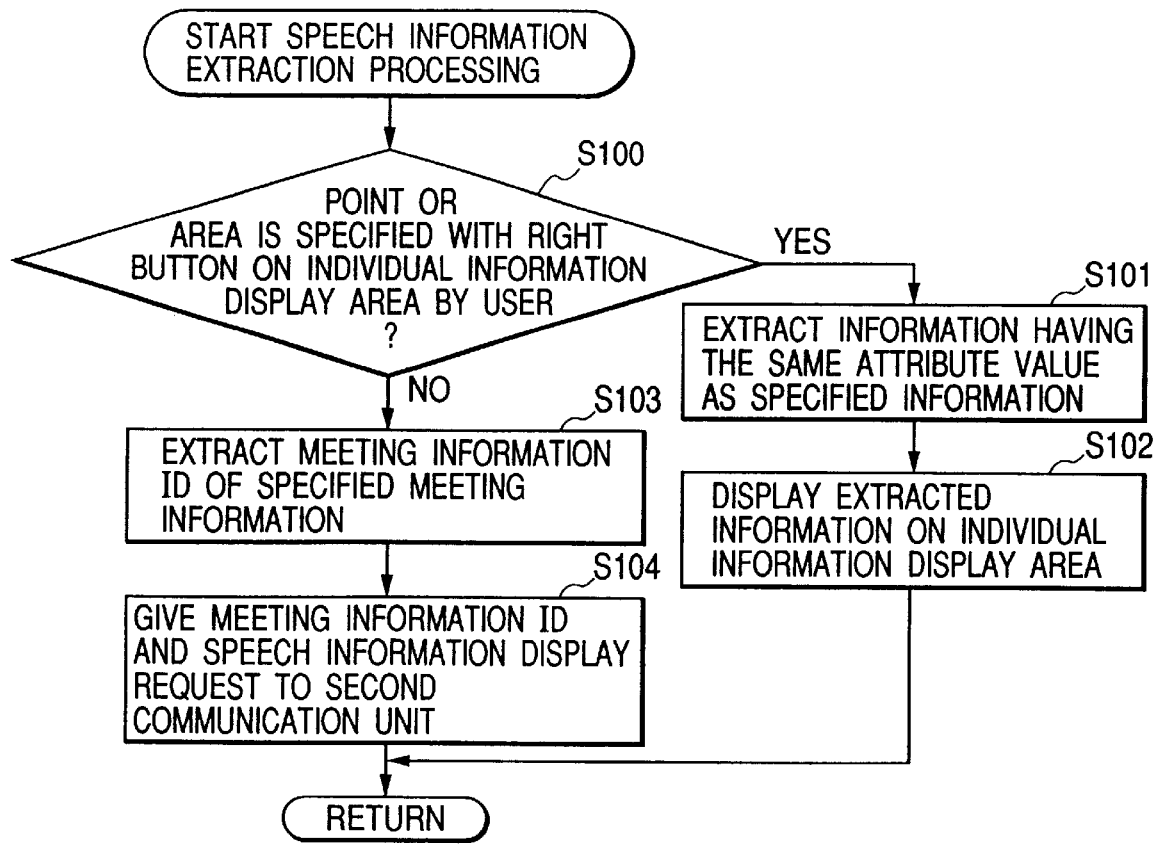
FIG. 37 is a flowchart for describing the details of "speech information extraction processing" shown in FIG. 30.

Next, the details of "speech information extraction processing" in step S32 shown in FIG. 30 are described with reference to FIG. 37. When this flowchart is started, the processing described hereunder is performed.

[S100] The second analysis unit 3c refers to the information supplied from the input unit 3b, if a point or area is specified by operating the right button of the mouse 4 in the individual information display area 10b, then the sequence proceeds to step S101, and otherwise if a point or area is specified by operating the left button of the mouse 4, then the sequence proceeds to step S103.

[S101] The second analysis unit 3c extracts the information having the same attribute value as the specified meeting information from the second memory unit 3e by way of the second attribute extraction unit 3d.

[S102] The second analysis unit 3c supplies the information extracted in step S101 to the display unit 3g, and displays it in the individual information display area 10b.

[S103] The second analysis unit 3c extracts the meeting information ID of the specified meeting information from the second memory unit 3e by way of the second attribute extraction unit 3d.

[S104] The second analysis unit 3c supplies the meeting information ID and speech information display request to the second communication unit 3a, then the sequence returns to the original processing. As the result, the second communication unit 3a generates a request which includes the meeting information ID and the speech information display request, and transmits the request to the server 1.

Figure 38:
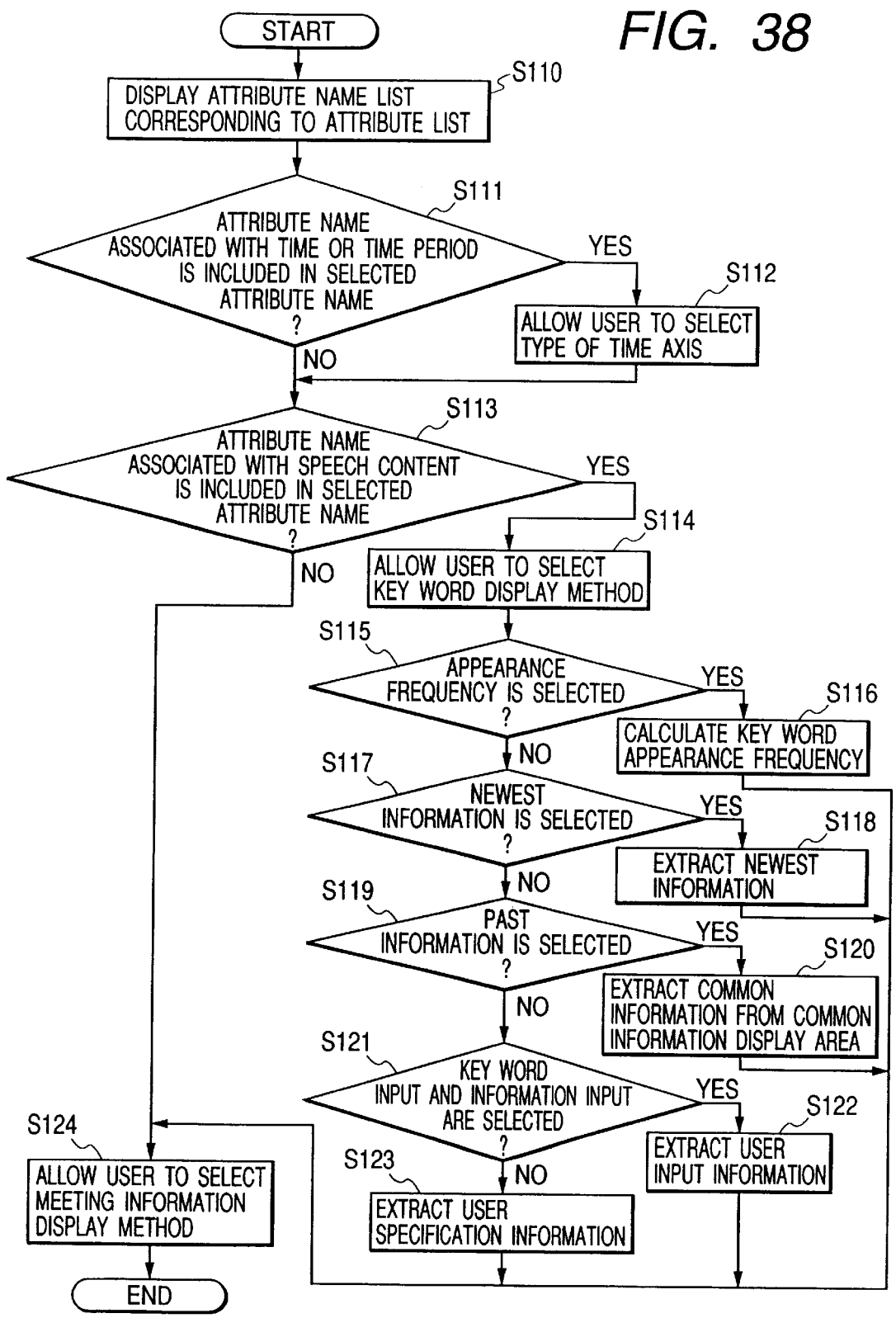
FIG. 38 is a flowchart for describing exemplary processing performed when the overlook condition is entered.

Next, an example of processing performed when the overlook condition is entered is described with reference to FIG. 38. When this flowchart is started, the processing described hereunder is performed.

[S110] The second analysis unit 3c acquires the attribute list from the second memory unit 3e and supplies it to the display unit 3g to display the attribute name list on the display device 5.

[S111] In the processing in the second analysis unit 3c, if an attribute name associated with time or time period is included in the attribute name selected from the attribute name list displayed in step S110, then the sequence proceeds to step S112, and otherwise the sequence proceeds to step S113.

[S112] The second analysis unit 3c controls the display unit 3g to display the dialogue box shown in FIG. 14 on the display device 5, and calls upon a user to select the time axis type.

[S113] In the processing in the second analysis unit 3c, if an attribute name associated with the speech content is included in the attribute name selected from the attribute name list displayed in step S110, then the sequence proceeds to step S114, and otherwise the sequence proceeds to step S124.

[S114] The second analysis unit 3c controls the display unit 3g to display the dialogue box shown in FIG. 15 on the display device 5, and call upon a user to select a method for displaying the key word.

[S115] The second analysis unit 3c refers to the information entered in step S114, and if the item "appearance frequency" is selected, then the sequence proceeds to step S116, and otherwise the sequence proceeds to step S117.

[S116] The second analysis unit 3c calculates the appearance frequency of the key word and the sequence proceeds to step S124.

[S117] In the processing in the second analysis unit 3c, if the item "newest information" is selected, then the sequence proceeds to step S118, and otherwise the sequence proceeds to step S119.

[S118] The second analysis unit 3c extracts the newest information from the second memory unit 3e by way of the second attribute extraction unit 3d.

[S119] In the processing in the second analysis unit 3c, if the item "past information" is selected, then the sequence proceeds to step S120, and otherwise the sequence proceeds to step S121.

[S120] The second analysis unit 3c extracts the common information specified by a user in the common information display area 10a, and the sequence proceeds to step S124.

[S121] In the processing in the second analysis unit 3c, if any one of the item "key word input" and the item "information input" is selected, the sequence proceeds to step S122, and otherwise the sequence proceeds to step 123.

[S122] The second analysis unit 3c controls the display device 5 to display the dialogue box shown in FIG. 17 or FIG. 18 to receive the information input, then the sequence proceeds to step S124.

[S123] The second analysis unit 3c controls the display device 5 to display the dialogue box shown in FIG. 19 to call upon a user to specify the information, and acquires the specified information, then the sequence proceeds to step S124.

[S124] The second analysis unit 3c controls the display device 5 to display the menu screen shown in FIG. 20 to call upon a user to select the display method of the meeting information.

Figure 39:
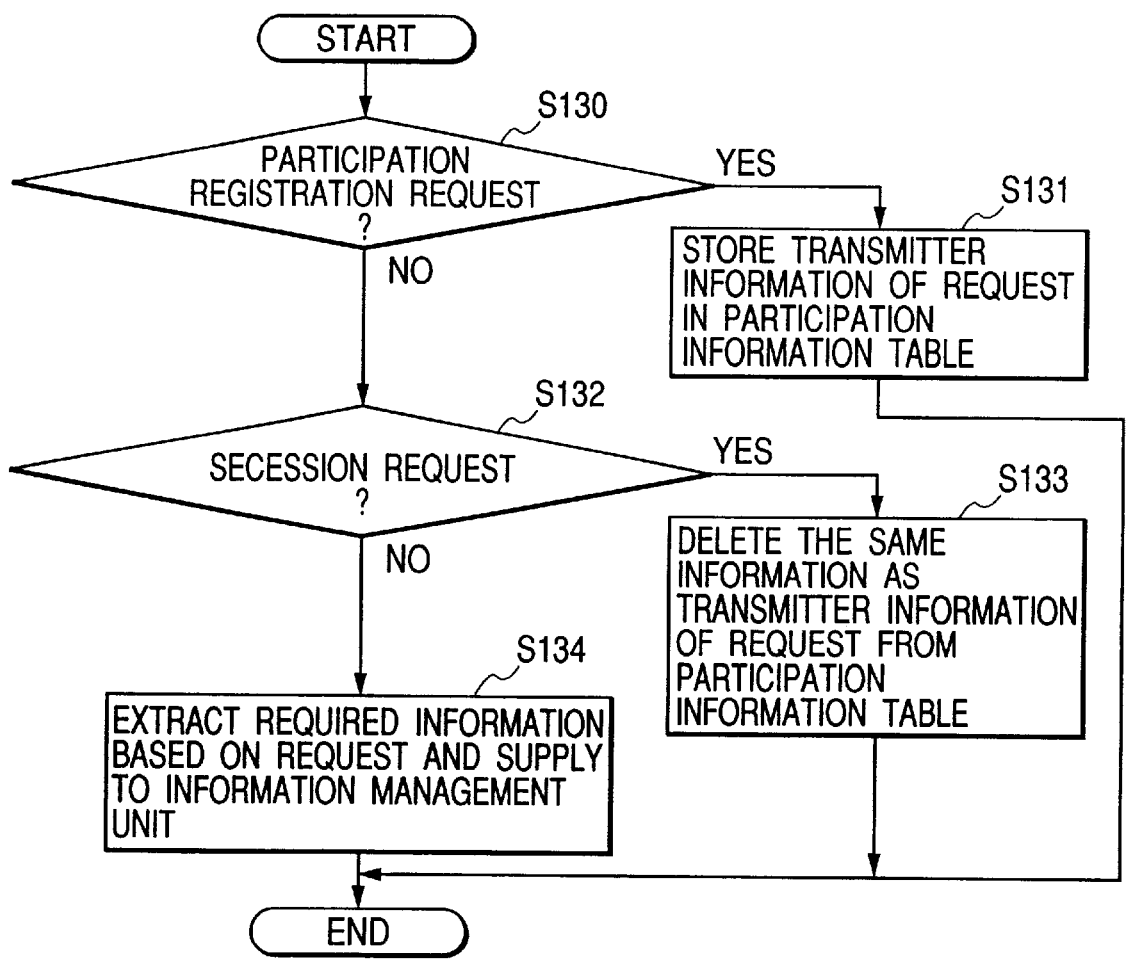
FIG. 39 is a flowchart for describing exemplary processing performed in the first analysis unit of a server.

Next, an example performed in the first analysis unit 1b of the server 1 is described with reference to FIG. 39. When this flowchart is started, the processing described hereunder is performed.

[S130] In the processing in the first analysis unit 1b, if the request supplied from the first communication unit 1a is a participation registration request, the sequence proceeds to step S131, and otherwise the sequence proceeds to step S132.

[S131] The first analysis unit 1b extracts the transmitter information from the request and supplies it to the information management unit 1d to store it in the participation information table.

[S132] In the processing in the first analysis unit 1b, if the request supplied form the first communication unit 1a is a leave request, then the sequence proceeds to step S133, and otherwise the sequence proceeds to step S134.

[S133] The first analysis unit 1b deletes the same information as the transmitter information included in the request from the participation information table.

[S134] The first analysis unit 1b extracts the necessary information from the request, and supplies the necessary information to the information management unit 1d. For example, if the request is an individual information display request, the corresponding information is retrieved from the first memory unit 1e, and the information is transmitted from the first communication unit 1a to the client 3.

Figure 40:
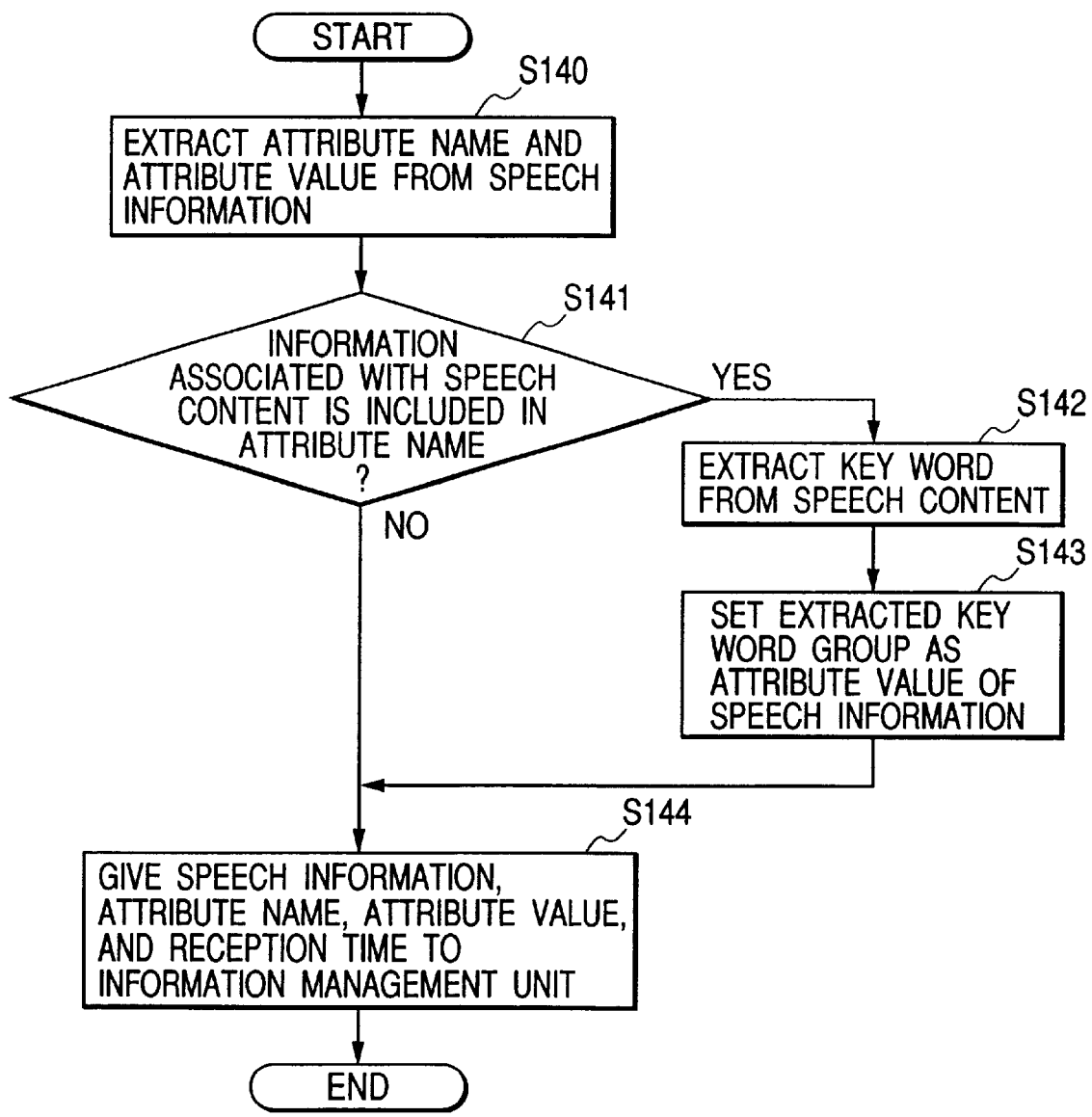
FIG. 40 is a flowchart for describing exemplary processing performed in the first attribute extraction unit of a server.

Next, an example of processing performed in the first attribute extraction unit 1c of the server 1 is described with reference to FIG. 40. When this flowchart is started, the processing described hereunder is performed.

[S140] The first attribute extraction unit 1c extracts the attribute name and attribute value from the speech information supplied from the first analysis unit 1b.

[S141] In the processing in the first attribute extraction unit 1c, if the information associated with the attribute name is included in the attribute name, then the sequence proceeds to step S142, and otherwise the sequence proceeds to step S144.

[S142] The first attribute extraction unit 1c extracts the key word from the speech content.

[S143] The first attribute extraction unit 1c sets the extracted key word group as the attribute value of the speech information.

[S144] The first attribute extraction unit 1c supplies the speech information, attribute name, attribute value, and reception time to the information management unit Id to store in the meeting information table of the first memory unit 1e.

Figure 41:
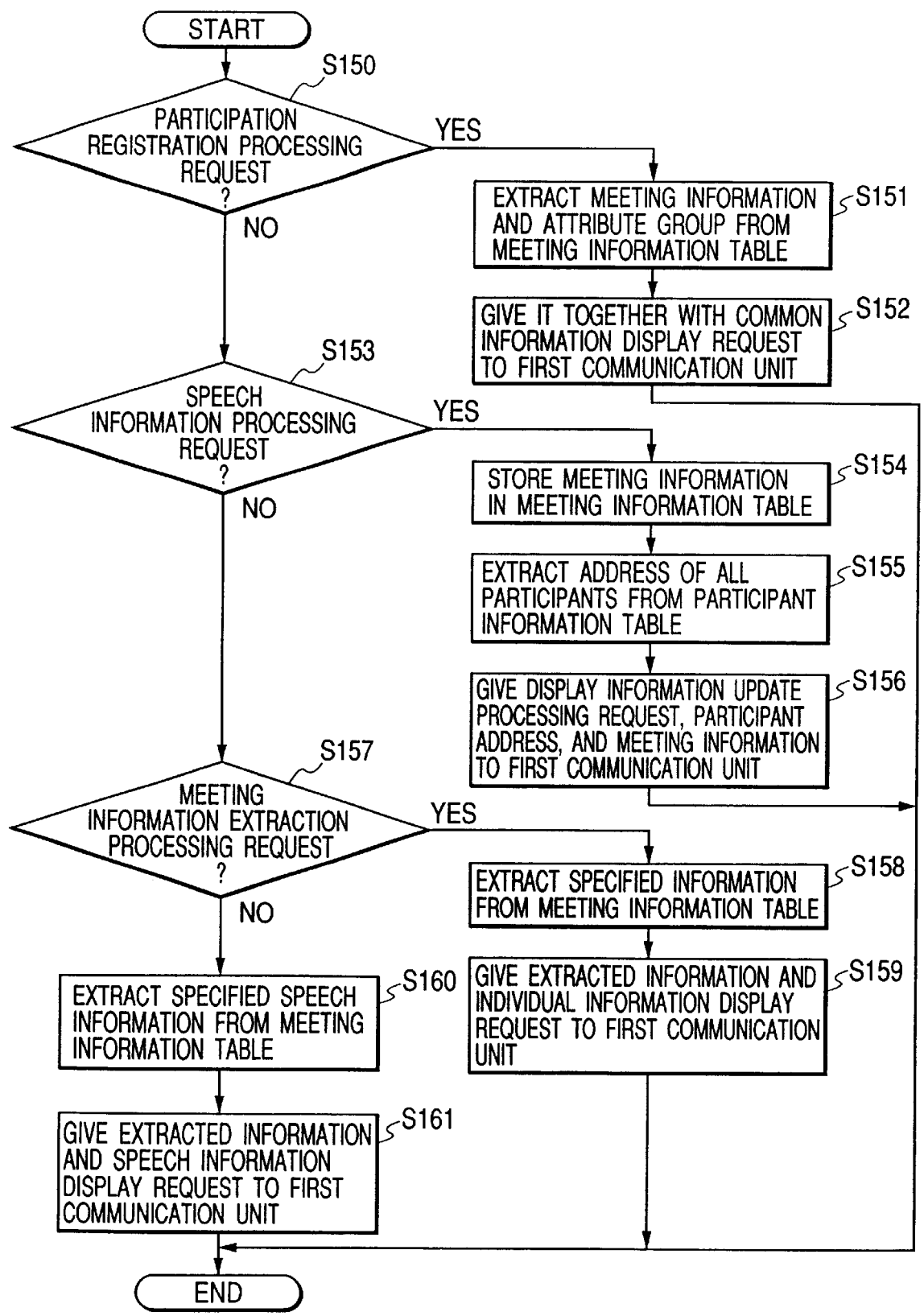
FIG. 41 is a flowchart for describing exemplary processing performed by the first analysis unit and information management unit of a server.

Next, an example of processing performed by the first analysis unit 1b and the information management unit 1d of the server 1 is described with reference to FIG. 41. When this flowchart is started, the processing described hereunder is performed.

[S150] In the processing in the first analysis unit 1b, if the processing request supplied from the first communication unit 1a is a participation registration processing request, then the sequence proceeds to step S151, and otherwise the sequence proceeds to step S153.

[S151] The information management unit 1d extracts the meeting information and the attribute group of the meeting which is to be a participation target from the meeting information table.

[S152] The first analysis unit 1b supplies the information extracted in step S151 to the first communication unit 1a together with the common information display request.

[S153] In the processing in the first analysis unit 1b, if the processing request supplied from the first communication unit 1a is a speech information processing request, then the sequence proceeds to step S154, and otherwise the sequence proceeds to step S157.

[S154] The information management unit 1d stores the meeting information supplied from the first analysis unit 1b in the meeting information table of the first memory unit 1e.

[S155] The information management unit 1d extracts the address of all participants from the participant information table.

[S156] The first analysis unit 1b supplies the address of the participants extracted in step S155, the meeting information, and the display information update processing request to the first communication unit 1a.

[S157] In the processing in the first analysis unit 1b, if the processing request supplied from the first communication unit 1a is a meeting information extraction processing request, then the sequence proceeds to step S158, and otherwise the sequence proceeds to step S160.

[S158] The information management unit 1d extracts the specified information from the meeting information table.

[S159] The first analysis unit 1b supplies the extracted information and the individual information display request to the first communication unit 1a.

[S160] The information management unit 1d acquires the specified speech information from the meeting information table.

[S161] The first analysis unit 1b supplies the extracted meeting information and the speech information display request to the first communication unit 1a.

By performing a series of processing described hereinbefore, it is possible that the server 1 and client 3 realize the above-mentioned function.

In the embodiment described hereinbefore, one attribute is allocated to one axis, however otherwise a plurality of attributes (in this example, two) may be allocated to one axis as shown in FIG. 42. In this example, the title and the speech content are allocated to one axis. According to the embodiment, it is possible to overlook a plurality of attributes simultaneously.

Finally, the above-mentioned processing function is implemented by use of a computer. In this case, the processing content of the function to be provided to the sever or client is described in a program recorded in a recording medium which are readable by the computer, and the computer executes the program to realize the above-mentioned processing. As the recording media which are readable by a computer, a magnetic recording device, semiconductor memory or the like are available.

For distribution in the market, a potable recording medium such as CD-ROM (Compact Disk Read Only Memory), floppy disc, or the like in which the program is stored may be distributed, otherwise the program which is stored in a memory of a computer connected to a network is transferred to other computers by way of the network. When the program is executed by use of a computer, the program is stored in a hard disk device in the computer, and the program is loaded to the main memory for execution.

As described hereinbefore, in the electronic meeting system of the present invention, the above-mentioned sever is provided with: a first communication unit for communicating information with the clients; a first analysis unit for analyzing the information when the first communication unit receives the information transmitted from the client; a first attribute extraction unit for extracting the attribute included in the information if the information is judged to be new information to be written in the virtual space as the result of analysis performed by the first analysis unit; a first memory unit for storing the attribute extracted by the first attribute extraction unit and the information which are correlated; and an information management unit which manages information stored in the first memory unit, and if the information is judged to be information that requires to be referred to the information stored in the first memory unit as the result of analysis performed by the first analysis unit, then extracts the corresponding information and supplies to the first communication unit to return it to the client. The above-mentioned client is provided with a second communication unit for communicating information with the server; an input unit for receiving desired information input; a second analysis unit for analyzing the information transmitted from the server and received from the second communication unit or the information entered by the input unit; a second attribute extraction unit for extracting the attribute included in the information if the information is judged to be information to be displayed as output as the result of analysis performed by the second analysis unit; a second memory unit for storing the attribute extracted by the second attribute extraction unit; a selection unit for selecting a desired attribute from among attributes stored in the second memory unit; and a display unit for displaying an element in accordance with the information written in the virtual space in the form of display type corresponding to the attribute selected by the selection unit. And it is therefore possible to provide the information desired by a user in the form desired by the user and support smooth progress of a meeting.

The information processor of the present invention is provided with: a communication unit for communicating information with the server; an input unit for receiving desired information input; an analysis unit for analyzing the information transmitted from the server which is received by the communication unit or the information supplied from the input unit; an attribute extraction unit for extracting the attribute included in the information if the information is judged to be displayed as output as the result of analysis performed by the analysis unit; a memory unit for storing the attribute extracted by the attribute extracting unit; a selection unit for selecting a desired attribute from among attributes stored in the memory unit; and a display unit for displaying an element in accordance with the information written in the virtual space in the form of display type which is selected by the selection unit. And it is therefore possible that a user can overlook a meeting from a unique view point, enabling a user to understand the progress of a meeting easily.

What is claimed is:

1. An electronic meeting system where a plurality of clients access a virtual space provided by a server for exchanging information, said server comprising:
a first communication unit that communicates information with said clients;
a first analysis unit that analyzes the information when said first communication unit receives said information transmitted from said client;
a first attribute extraction unit that extracts the attribute included in said information if said information is judged to be new information to be written in said virtual space as the result of analysis performed by said first analysis unit;
a first memory unit that stores said attribute extracted by said first attribute extraction unit and said information which are correlated; and
an information management unit that manages information stored in said first memory unit, and if said information is judged to be information that requires to be referred to the information stored in said first memory unit as the result of analysis performed by said first analysis unit, then extracts the corresponding information and supplies it to said first communication unit to return it to said client, said client comprising:
a second communication unit that communicates information with said server;
an input unit that receives desired information input;
a second analysis unit for analyzing the information transmitted from said server and received from said second communication unit or the information entered by said input unit;
a second attribute extraction unit that extracts the attribute included in the information if the information is judged to be information to be displayed as output as the result of analysis performed by said second analysis unit;
a second memory unit that stores the attribute extracted by said second attribute extraction unit;
a selection unit that selects a desired attribute from among attributes stored in said second memory unit; and
a display unit that displays an element in accordance with the information written in said virtual space in the form of display type corresponding to the attribute selected by said selection unit.

2. The electronic meeting system as claimed in claim 1, wherein said display unit displays the information associated with key word included in the newest information among the information written in said virtual space as the element in accordance with said information.

3. The electronic meeting system as claimed in claim 1, wherein said display unit displays the information associated with key word included in the information specified by a user among the information written in said virtual space as the element in accordance with said information.

4. The electronic meeting system as claimed in claim 1, wherein said display unit displays the information associated with key word specified by a user among the information written in said virtual space as the element in accordance with said information.

5. The electronic meeting system as claimed in claim 1, wherein said display unit displays only the element in accordance with the information having the attribute value corresponding to the attribute selected by said selection unit.

6. The electronic meeting system as claimed in claim 1, wherein said display unit displays only the element in accordance with the information which includes attribute values of the prescribed number corresponding to the attribute selected by said selection unit.

7. The electronic meeting system as claimed in claim 1, wherein said display unit displays only the element in accordance with the information which includes the attribute value corresponding to the attribute selected by said selection unit, and changes the display format according to its appearance frequency.

8. The electronic meeting system as claimed in claim 1, wherein if desired information is entered from said input unit and the element in accordance with the desired information displayed by said display unit is selected, the details of the information are further displayed.

9. The electronic meeting system as claimed in claim 1, wherein if desired information is entered from said input unit and the element in accordance with the desired information is selected, the element in accordance with other information having the same attribute value as the attribute value of the information is selected and displayed.

10. The electronic meeting system as claimed in claim 1, wherein said display unit selects any of one-dimensional space to three-dimensional space correspondingly to the selection result obtained by said selection unit, and displays the element in accordance with said information in the selected display target space.

11. The electronic meeting system as claimed in claim 1, wherein said display unit displays the information associated with the key word included in said information as the element associated with said information if the attribute associated with the content of said information is selected by said selection unit.

12. The electronic meeting system as claimed in claim 10, wherein said display unit displays the element in accordance with said information by use of one axis corresponding to the desired attribute and a plane corresponding to other attributes when the three-dimensional space is selected as the result of selection performed by said selection unit.

13. The electronic meeting system as claimed in claim 10, wherein said display unit allocates a plurality of attributes to one axis of said display target space to display the element in accordance with said information.

14. The electronic meeting system as claimed in claim 10, wherein said one axis of said display target space corresponds to the attribute associated with time.

15. The electronic meeting system as claimed in claim 11, wherein said display unit displays said key word selected suitably depending on the appearance frequency.

16. An information processor served as a client for taking access to virtual space provided by a server to exchange information, comprising:

a communication unit that communicates information with said server;

an input unit that receives a desired information input;

an analysis unit that analyzes the information transmitted from said server which is received by said communication unit or the information supplied from said input unit;

an attribute extraction unit that extracts the attribute included in the information if the information is judged to be displayed as output as the result of analysis performed by said analysis unit;

a memory unit that stores the attribute extracted by said attribute extraction unit;

a selection unit that selects a desired attribute from among attributes stored in said memory unit; and a display unit that displays an element in accordance with the information written in said virtual space in the form of display type which is selected by said selection unit.

17. A medium which a computer can read and which has a stored program for making said computer access virtual space provided by a server for performing information exchange processing, wherein said program for making said computer function as:

a communication unit that communicates information with said server;

an input unit that receives desired information input;

an analysis unit that analyzes the information transmitted from said server which is received by said communication unit or the information supplied from said input unit;

an attribute extraction unit that extracts the attribute included in the information if the information is judged to be displayed as output as the result of analysis performed by said analysis unit;

a memory unit that stores the attribute extracted by said attribute extraction unit;

a selection unit that selects a desired attribute from among attributes stored in said memory unit; and a display unit that displays an element in accordance with the information written in said virtual space in the form of display type which is selected by said selection unit.

* * * * *